US010846468B2

(12) United States Patent
Zhao

(10) Patent No.: US 10,846,468 B2
(45) Date of Patent: Nov. 24, 2020

(54) APPARATUS AND METHODS FOR CREATING AND SENDING TABLE INFORMATION

(71) Applicant: TENCENT TECHNOLOGY (SHENZHEN) COMPANY LIMITED, Shenzhen (CN)

(72) Inventor: Na Zhao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 126 days.

(21) Appl. No.: 15/975,993

(22) Filed: May 10, 2018

(65) Prior Publication Data
US 2018/0260372 A1 Sep. 13, 2018

Related U.S. Application Data

(63) Continuation of application No. PCT/CN2017/084817, filed on May 18, 2017.

(30) Foreign Application Priority Data

Jun. 1, 2016 (CN) .......................... 2016 1 0383822
Jun. 1, 2016 (CN) .......................... 2016 1 0387145

(51) Int. Cl.
G06F 17/00 (2019.01)
G06F 40/177 (2020.01)
(Continued)

(52) U.S. Cl.
CPC .......... G06F 40/177 (2020.01); G06F 3/0484 (2013.01); G06F 9/44526 (2013.01);
(Continued)

(58) Field of Classification Search
CPC .. G06F 17/245; G06F 3/0484; G06F 9/44526; G06F 40/177; G06F 3/04842;
(Continued)

(56) References Cited

U.S. PATENT DOCUMENTS 10,009,391 B1 * 6/2018 Smith .................. G06F 16/972
2005/0177573 A1 8/2005 Gauthier et al.
(Continued)

FOREIGN PATENT DOCUMENTS

CN 101615177 12/2009
CN 101789131 A 7/2010
(Continued)

OTHER PUBLICATIONS

International Search Report dated Aug. 11, 2017 in PCT/CN2017/084817, filed May 18, 2017 (w/ English translation) 5 pp.
(Continued)

Primary Examiner — Jason T Edwards
(74) Attorney, Agent, or Firm — Oblon, McClelland, Maier & Neustadt, L.L.P.

(57) ABSTRACT

The present disclosure provides a method for information creation. In the disclosed method, a table information creation instruction is obtained from a user, and a table information processing plug-in is triggered according to the table information creation instruction. Subsequently, a table file is obtained through the table information processing plug-in, and the table file is presented on an information sending interface. Further, an information creation instruction is received, and the table file that is presented on the information sending interface is converted into first message information according to the information creation instruction by circuitry of an information creation apparatus.

20 Claims, 18 Drawing Sheets

(51) Int. Cl.
*H04L 12/58* (2006.01)
*G06Q 50/00* (2012.01)
*G06Q 10/10* (2012.01)
*G06F 3/0484* (2013.01)
*G06F 9/445* (2018.01)

(52) U.S. Cl.
CPC ............ *G06Q 10/10* (2013.01); *G06Q 50/01* (2013.01); *H04L 51/046* (2013.01); *H04L 51/32* (2013.01); *H04L 51/08* (2013.01)

(58) Field of Classification Search
CPC .. G06F 3/04847; G06F 3/04855; G06F 40/18; G06Q 10/10; G06Q 50/01; H04L 51/046; H04L 51/32; H04L 51/08
USPC ....................................................... 715/227
See application file for complete search history.

(56) References Cited

U.S. PATENT DOCUMENTS

| | | | |
|---|---|---|---|
| 2006/0112123 A1* | 5/2006 | Clark | G06F 40/18 |
| 2006/0181540 A1* | 8/2006 | Loo | G11B 27/034 |
| | | | 345/551 |
| 2010/0083083 A1* | 4/2010 | Berger | G06F 40/18 |
| | | | 715/212 |
| 2011/0087651 A1* | 4/2011 | Westin | G06F 19/321 |
| | | | 707/722 |
| 2011/0161796 A1 | 6/2011 | Laikin | |
| 2011/0292072 A1* | 12/2011 | Fisher | G06T 11/60 |
| | | | 345/619 |
| 2011/0302483 A1 | 12/2011 | Greenberg | |
| 2012/0089659 A1* | 4/2012 | Halevi | G06F 3/04842 |
| | | | 709/201 |
| 2012/0284344 A1 | 11/2012 | Costenaro et al. | |
| 2013/0212470 A1 | 8/2013 | Karunamuni et al. | |
| 2013/0254644 A1 | 9/2013 | Rochelle et al. | |
| 2015/0205847 A1* | 7/2015 | Gloski | G06F 21/6218 |
| | | | 707/771 |
| 2015/0286489 A1* | 10/2015 | Brown, Jr. | G06Q 30/0621 |
| | | | 717/178 |

FOREIGN PATENT DOCUMENTS

| | | |
|---|---|---|
| CN | 102426568 | 4/2012 |
| CN | 103518220 A | 1/2014 |
| CN | 103914859 A | 7/2014 |
| CN | 104090850 | 10/2014 |
| CN | 104246678 A | 12/2014 |
| CN | 104615391 | 5/2015 |
| CN | 104881776 | 9/2015 |
| CN | 106095739 A | 11/2016 |
| CN | 106100971 A | 11/2016 |
| JP | 1083362 | 3/1998 |

OTHER PUBLICATIONS

Chinese Office Action dated Jun. 1, 2018 in Application No. 201610383822.1 with concise English translation, (12 pages).

Chinese Office Action dated Oct. 24, 2018 in Application No. 201610387145.0 with concise English translation, (8 pages).

Mtzhui, "How to Insert Tables and Charts into Outlook Email," Jan. 20, 2015, URL <https://jingyan.baidu.com/article/375c8e19b7834e25f2a22994.html> (4 pages).

Qingshan Yang, "Inserting Tables Directly into Foxmail Email," Computer Knowledge and Technology, Jan. 31, 2009. (2 pages).

* cited by examiner

APPARATUS AND METHODS FOR CREATING AND SENDING TABLE INFORMATION

RELATED APPLICATION

This application is a continuation of International Application No. PCT/CN2017/084817 filed on May 18, 2017 which claims priority to Chinese Patent Application No. 201610387145.0, entitled "INFORMATION CREATION AND INFORMATION SENDING METHODS AND INFORMATION CREATION AND INFORMATION SENDING APPARATUSES," filed on Jun. 1, 2016, and claims priority to Chinese Patent Application No. 201610383822.1, entitled "INFORMATION CREATION METHOD AND INFORMATION CREATION APPARATUS," filed on Jun. 1, 2016. The entire disclosures of the prior applications are hereby incorporated by reference in their entirety.

FIELD OF THE TECHNOLOGY

This application relates to the technical field of information processing.

BACKGROUND OF THE DISCLOSURE

With social development, people use various social tools to perform various information communications. As a further extension, people may send some files in different formats such as pictures or texts to each other when communicating.

When users send a table file, such as a file in an xls format of excel, to each other, the file cannot be previewed like a picture file because the table file has a display background, that is, the users need to perform grid division on data. Therefore, when the users exchange a table file by using an related social tool, a file sender can only send the table file to a friend as an entire file, or copy and then convert an effective presentation part in the table file into a picture file and send the picture file to the friend.

The table file cannot be quickly previewed if a file receiver receives the entire file; and the picture file cannot be performed with an editing operation if the file receiver receives the picture file. As a result, related table file communication efficiency is relatively low.

SUMMARY

In one embodiment, a method for information creation is provided. In the disclosed method for information creation, a table information creation instruction is obtained, and a table information processing plug-in is triggered according to the table information creation instruction. Subsequently, a table file is obtained through the table information processing plug-in, and the table file is presented on an information sending interface. Further, an information creation instruction is received, and the table file that is presented on the information sending interface is converted into first message information according to the information creation instruction by circuitry of an information creation apparatus.

In another embodiment, a method for information sending is provided. Message information is obtained from the user and a receiving terminal of the message information is determined. The message information includes a table file. In one example, the message information is sent to the receiving terminal when the receiving terminal has a table information processing plug-in. In another example, the table file included in the message information is converted into a picture file, and the converted message information is sent to the receiving terminal when the receiving terminal does not have the table information processing plug-in.

In another embodiment, an information creation apparatus is provided. The apparatus include processing circuitry. The processing circuitry is configured to obtain a table information creation instruction, and trigger a table information processing plug-in according to the table information creation instruction. The processing circuitry is further configured to obtain a table file through the table information processing plug-in, and present the table file on an information sending interface. The processing circuitry is further configured to receive an information creation instruction, and convert the table file that is presented on the information sending interface into message information according to the information creation instruction.

In another embodiment, an information sending apparatus is provided. The information sending apparatus include processing circuitry. The processing circuitry is configured to obtain message information and determine a receiving terminal of the message information. The message information includes a table file. The processing circuitry is further configured to send the message information to the receiving terminal when the receiving terminal has a table information processing plug-in. When the receiving terminal does not have the table information processing plug-in, the processing circuitry is configured to convert the table file included in the message information into a picture file, and send the converted message information to the receiving terminal.

In another embodiment of the current disclosure, a non-transitory computer-readable storage medium storing a program executable by a processor to perform information creation and/or sending is provided.

Table file communication efficiency can be improved by using the foregoing solutions provided in this application.

DESCRIPTION OF EMBODIMENTS

Referring to the figures, same component symbols represent same components. The principle of this application is described by using an example in which this application is implemented in a proper computing environment. The following descriptions are based on specific embodiments shown in this application, and should not be considered as a limitation to other specific embodiments of this application that are not described herein in detail.

In the following descriptions, the specific embodiments of this application are described with reference to steps of operations performed by one or more computers and symbols, unless otherwise defined. Therefore, these steps and operations may be understood. It is referred to for several times that these steps and operations are performed by a computer, including being manipulated by a computer processing unit. The manipulating converts data or maintains the data at a location in a memory system of the computer. An operation of the computer may be changed by means of reconfiguration or in a manner well known by a person skilled in the art. A data structure maintained by the data is a physical location of the memory, and has a particular property defined by a format of the data. However, the principle of this application is described by using the foregoing words, but is not intended to be a limitation. A person skilled in the art may understand that the following various steps and operation may also be implemented in hardware.

An information creation method and an information creation apparatus in this application may be applied to various electronic devices such as a mobile electronic device, a fixed electronic device, a wearable device, a head-mounted device, or a healthcare platform that can be connected to an instant social platform; and specifically, may be applied to an instant social APP, not limited to QQ, WeChat, and the like, in the electronic device. A user may send and present a table file by using a client, such as a social APP, in the mobile electronic device, the fixed electronic device, the wearable device, the head-mounted device, or the healthcare platform, so as to achieve quick communication of the table file. In this way, table file communication efficiency in the instant social APP is improved.

An information sending method and an information sending apparatus in this application may be applied to exchange servers (or messaging servers) of various instant social platforms, so that the exchange servers may integrate exchange information (or message information) of various electronic terminals.

Figure 1:
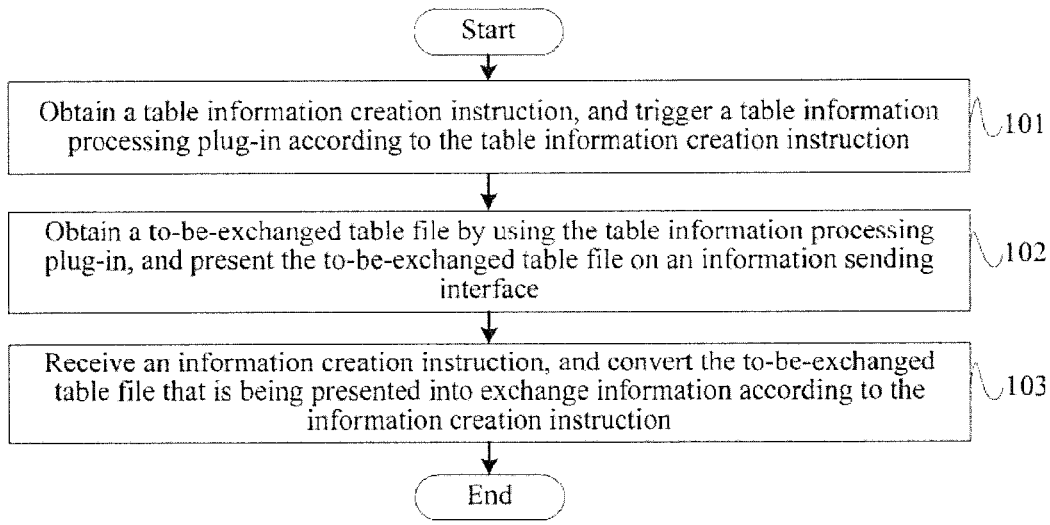
FIG. 1 is a schematic flowchart of an information creation method according to an embodiment of this application.

Referring to FIG. 1, FIG. 1 is a flowchart of a first embodiment of an information creation method according to this application. The information creation method in this embodiment may be applied to a client, such as a social APP, in the foregoing electronic device. The information creation method includes the following steps:

Step 101: Obtain a table information creation instruction, and trigger a table information processing plug-in according to the table information creation instruction.

Figure 22:
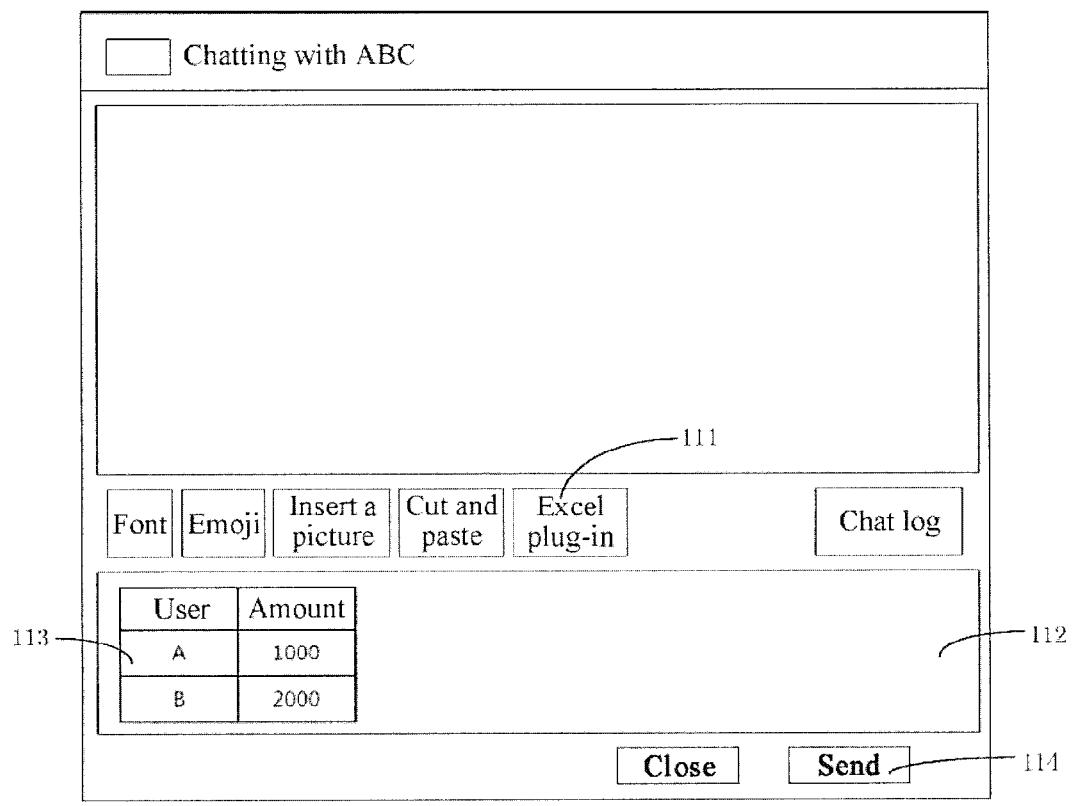
FIG. 22 is a schematic diagram of a chat panel in a first specific embodiment of an information creation method and an information creation apparatus according to this application.

In step 101, the table information creation instruction is obtained by the information creation apparatus. The table information creation instruction is an instruction indicating that a user needs to create a to-be-exchanged table file (or a table file). The to-be-exchanged table file (or table file) is a table file that needs to be exchanged by users. The to-be-exchanged table file may be a table file that is made by excel and that is in an xls format, or may be a table file that is made by wps and that is an et format. As shown in FIG. 22, when the users communicate with each other by using the social APP and when the user wants to send an excel table to a terminal of another party, the user clicks a control: Excel plug-in 111 in a chat window of the social APP, to generate the table information creation instruction. A social APP client obtains the table information creation instruction in response to the clicking operation of the user on the Excel plug-in 111, and triggers the table information processing plug-in according to the table information creation instruction. The table information processing plug-in herein is a plug-in that is preset in a client of a corresponding instant social platform, and is configured to perform creation, presentation, and editing operations on the table file. The table information processing plug-in is an application component for the user to create, edit, and present a table. The table information processing plug-in may be developed by a developer, or may be a table information processing plug-in provided by a third party. A program source code of the table information processing plug-in is added to a corresponding attribute file of an input box of the social APP. When the table file needs to be created, presented, or edited, the table information processing plug-in is invoked.

Step 102: Obtain a to-be-exchanged table file by using the table information processing plug-in, and present the to-be-exchanged table file on an information sending interface.

As shown in FIG. 22 again, when the user wants to send a table, the user first clicks the control: Excel plug-in 111, and then selects the table to be transmitted. The table may be a table pasted to the information sending interface by the user, or may be a table dragged to an information sending interface by the user. The social APP client obtains a table file that is pasted or dragged by the user to the information sending interface, and sends the table file to the table information processing plug-in. The table information processing plug-in presents the table file on the information sending interface. The presented table file is a file in a table format, different from an entire file. On the information sending interface, the user may view content in the table; may edit the table, including adding and deleting a line or a column of the table; and may edit or modify text content in the table. In addition, the table file to be transmitted may be a table file created on the information sending interface by invoking the table information processing plug-in.

Step 103: Receive an information creation instruction, and convert the to-be-exchanged table file (or table file) that is being presented into exchange information (or message information) according to the information creation instruction.

In step 103, the information creation apparatus in the social APP client receives the information creation instruction. The information creation instruction is an instruction for generating the to-be-exchanged table file presented in step 102 into corresponding exchange information, to send the exchange information to a corresponding receiving terminal. For example, in FIG. 11, the user clicks a sending control 114 in the chat window to generate the information creation instruction. The information creation apparatus in the social APP client receives the information creation instruction, and generates, according to the information creation instruction, the to-be-exchanged table file presented in step 102 into the corresponding exchange information, to send the exchange information to the corresponding receiving terminal.

In this way, a process of creating the exchange information of the information creation method in this embodiment is completed.

By using the information creation method provided in this embodiment of this application, on the information sending interface in the client of the social APP, the table file in the table format is obtained and presented by invoking the table information processing plug-in. The text content in the table file may be presented on the information sending interface, and the table file may further be edited, thereby improving table file communication efficiency.

Figure 2:
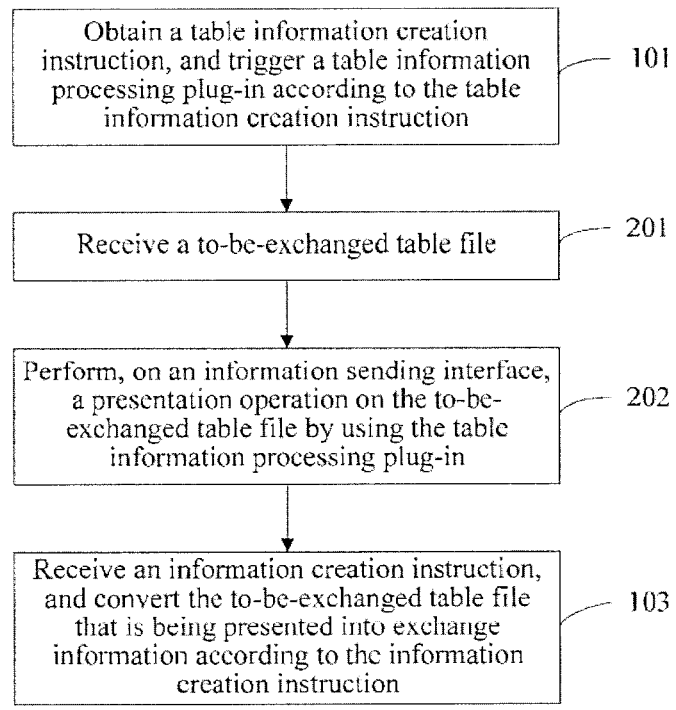
FIG. 2 is a flowchart of a first embodiment of an information creation method according to this application.

In some embodiments, in step 102, the following steps are included when obtaining the to-be-exchanged table file by using the table information processing plug-in, and presenting the to-be-exchanged table file on the information sending interface, as shown in FIG. 2. That is, step 102 in the embodiment shown in FIG. 1 is replaced with steps 201 and 202.

Step 201: Receive the to-be-exchanged table file.

The information creation apparatus in the social APP client receives the to-be-exchanged table file to be exchanged, and sends the to-be-exchanged table file to the table information processing plug-in. The to-be-exchanged table file is presented on the information sending interface by the table information processing plug-in. To receive the to-be-exchanged table file, the social APP client may receive a to-be-exchanged table file that is pasted to the information sending interface by the user, or may receive a to-be-exchanged table file that is dragged to the information sending interface by the user.

Step S202: Perform, on the information sending interface, a presentation operation on the to-be-exchanged table file by using the table information processing plug-in.

The information creation apparatus in the social APP client performs, on the information sending interface by using the table information processing plug-in, a presentation operation on the to-be-exchanged table file received in step S21. The information sending interface herein is an interface for the user to send the exchange information. When the social APP client does not have the table information processing plug-in, the received to-be-exchanged table file on the information sending interface is in a file format that cannot be identified. When the social APP client has the table information processing plug-in, the client in the social APP invokes a program component of the table information processing plug-in. The program component of the table information processing plug-in presents, on the information sending interface, the received to-be-exchanged table file in a table format. In this step, the to-be-exchanged table file is directly presented on the information sending interface in a table file format, so that the user confirms content in the to-be-exchanged table file.

By using the information creation method in the embodiments, on the information sending interface, presentation and editing operations are performed on the to-be-exchanged table file, and the exchange information having the table file may be sent, thereby improving the related table file communication efficiency. For example, a to-be-exchanged table can be pasted or dragged to the information sending interface, and then is sent to the receiving terminal.

Figure 3:
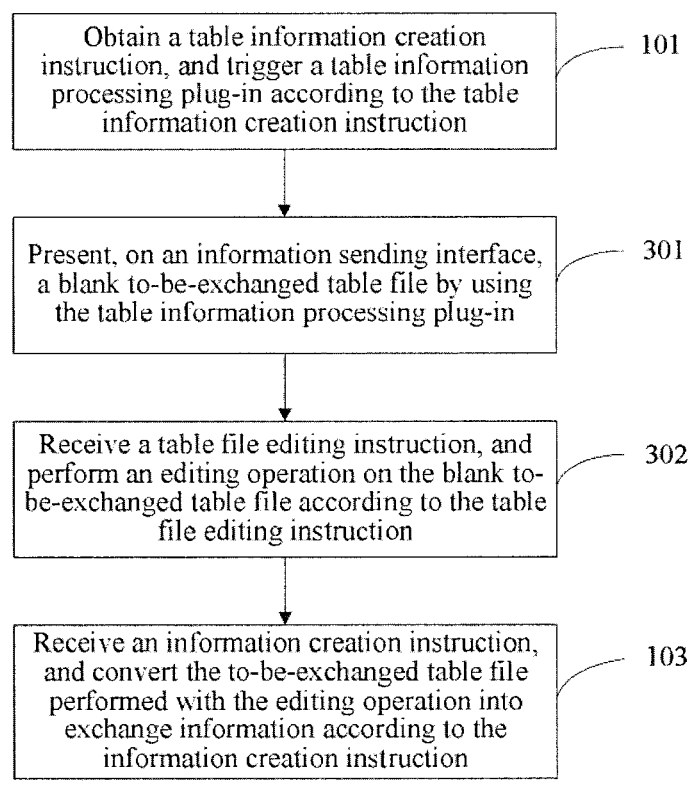
FIG. 3 is a flowchart of a second embodiment of an information creation method according to this application.

In some embodiments, in step 102, the following steps are included when obtaining the to-be-exchanged table file by using the table information processing plug-in, and presenting the to-be-exchanged table file on the information sending interface, as shown in FIG. 3. That is, step 102 in the embodiment shown in FIG. 1 is replaced with steps 301 and 302:

Step 301: Present, on the information sending interface, a blank to-be-exchanged table file by using the table information processing plug-in.

Figure 24A:
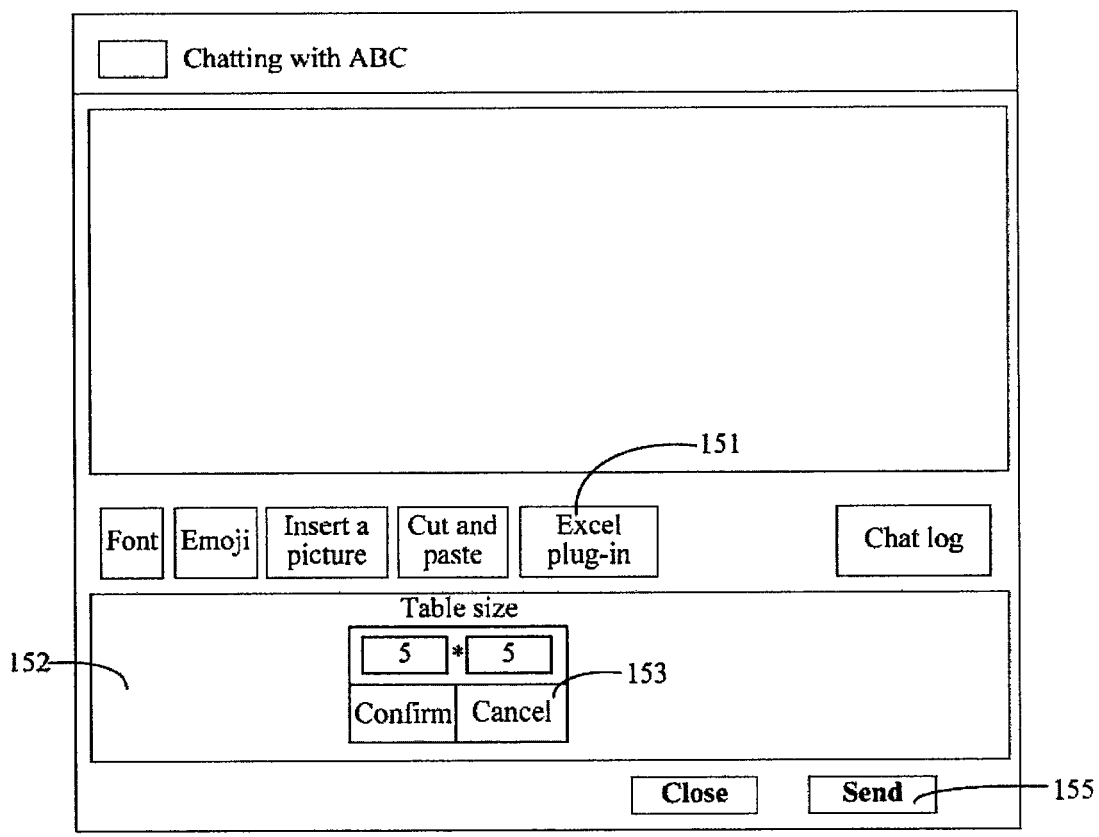
FIG. 24A to FIG. 24D are schematic diagrams of a chat panel in a specific embodiment of an information creation method and an information creation apparatus according to this application.
Figure 24B:
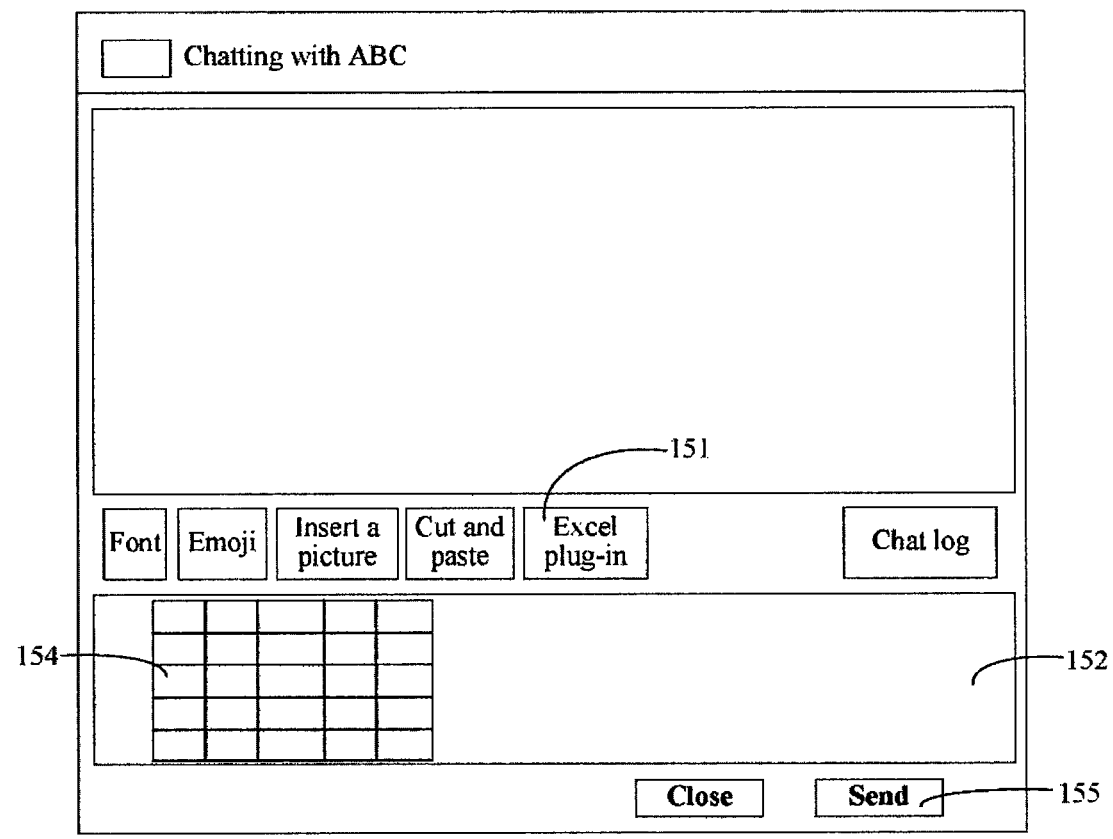

The information creation apparatus in the social APP client presents the blank to-be-exchanged table file by using the table information processing plug-in triggered in step 101, that is, creates the blank to-be-exchanged table file by using the table information processing plug-in, so that the user fills in the content of the table file. Specifically, as shown in an example shown in FIG. 24A, the user triggers an excel plug-in, that is, the table information processing plug-in, by clicking a plug-in triggering button 151 on a chat panel of the instant social platform. Because of existence of the excel plug-in, a table size setting interface 153 is presented on an information sending interface 152 of the instant social platform. The user enters line and column parameters of a corresponding to-be-exchanged table file on the table size setting interface 153, so as to form a corresponding blank to-be-exchanged table file 154, as shown in FIG. 24B.

Step 302: Receive a table file editing instruction, perform an editing operation on the blank to-be-exchanged table file by using the table information processing plug-in according to the table file editing instruction, and present the edited to-be-exchanged table file on the information sending interface.

The information creation apparatus in the social APP client receives the table file editing instruction. The table file editing instruction refers to an instruction instructing the user to edit content of the blank to-be-exchanged table file. Subsequently, the information creation apparatus invokes the table information processing plug-in which performs, according to the table file editing instruction, the editing operation on the blank to-be-exchanged table file presented in step S31. Meanwhile, the user confirms the content in the to-be-exchanged table file.

By using the information creation method in the embodiments, on the information sending interface, presentation and editing operations are performed on the blank to-be-exchanged table file, and the exchange information having the table file may be sent, thereby improving related table file communication efficiency. For example, a to-be-exchanged table is created on the information sending interface by using the table information processing plug-in, and then is sent to the receiving terminal.

Figure 4:
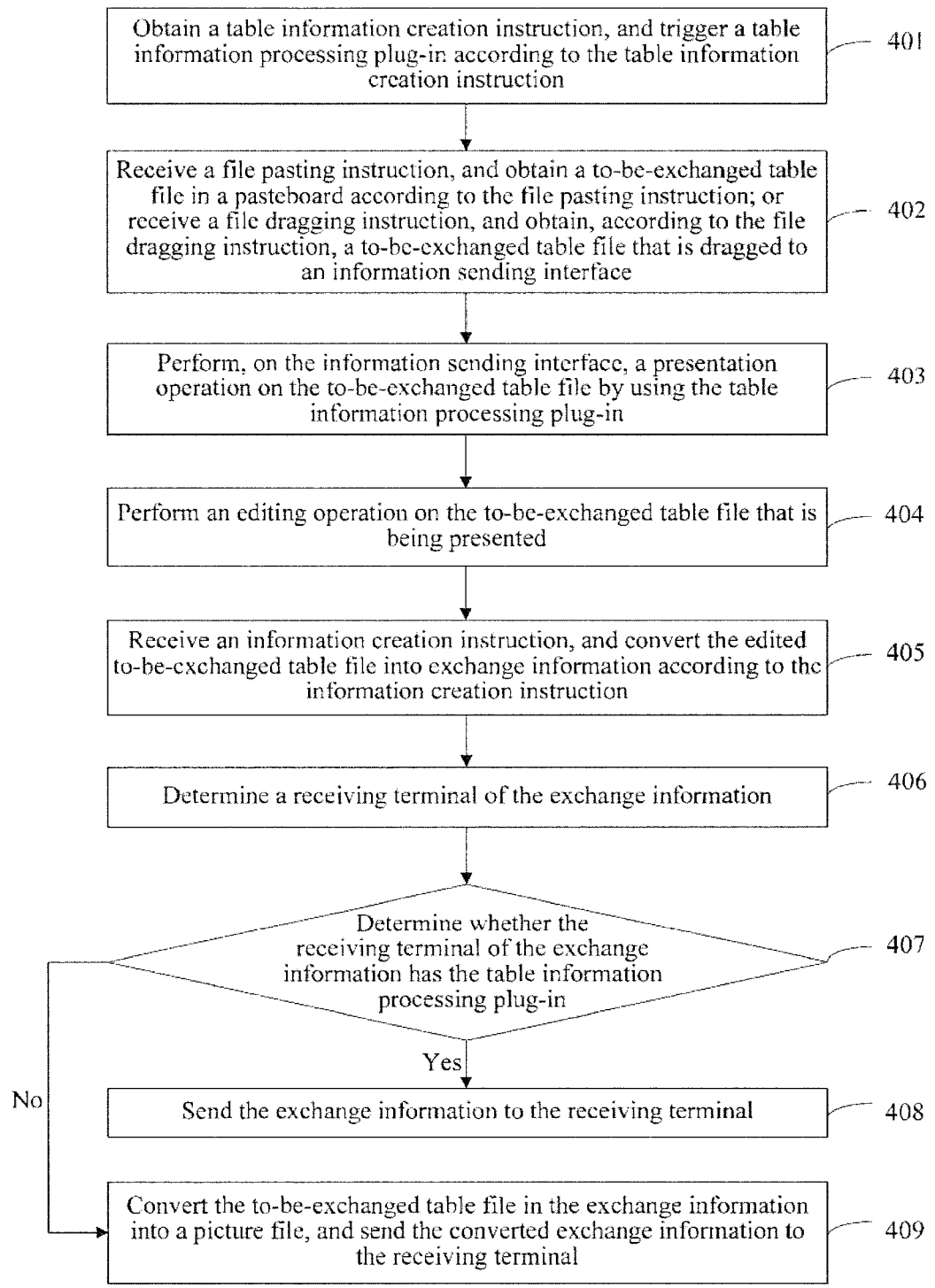
FIG. 4 is a flowchart of a first exemplary embodiment of an information creation method according to this application.

Referring to FIG. 4, FIG. 4 is a flowchart of still another embodiment of an information creation method according to this application. The information creation method in this embodiment may be implemented by using the foregoing electronic device. The information creation method includes:

Step 401: Obtain a table information creation instruction, and trigger a table information processing plug-in according to the table information creation instruction.

Step 402: Receive a file pasting instruction, and obtain a previously copied table file in a pasteboard according to the file pasting instruction; or receive a file dragging instruction, and obtain, according to the file dragging instruction, a to-be-exchanged table file that is dragged to an information sending interface.

Step 403: Perform, on the information sending interface, a presentation operation on the to-be-exchanged table file by using the table information processing plug-in.

Step 404: Perform an editing operation on the to-be-exchanged table file that is being presented.

Step 405: Receive an information creation instruction, and convert the edited to-be-exchanged table file into exchange information according to the information creation instruction.

The following steps 406 to 409 are operations performed by the exchange server.

Step 406: Determine a receiving terminal of the exchange information.

Step 407: Determine whether the receiving terminal of the exchange information has the table information processing plug-in, where step 408 is performed if the receiving terminal has the table information processing plug-in; and step 409 is performed if the receiving terminal does not have the table information processing plug-in.

Step 408: Send the exchange information to the receiving terminal.

Step 409: Convert the to-be-exchanged table file in the exchange information into a picture file, and send the converted exchange information to the receiving terminal.

Specific processes of the steps of the information creation method according to this embodiment are described below in detail.

In step 401, the table information creation instruction is obtained by the information creation apparatus. The table information creation instruction is an instruction indicating that a user needs to create the to-be-exchanged table file. The to-be-exchanged table file is a table file that needs to be exchanged by users. The to-be-exchanged table file may be a table file that is made by excel and that is in an xls format, or may be a table file that is made by wps and that is an et format.

Subsequently, the information creation apparatus triggers the table information processing plug-in according to the table information creation instruction. The table information processing plug-in herein is a plug-in that is preset in a client of a corresponding instant social platform, and is configured to perform creation, presentation, and editing operations on the table file.

In this step, the information creation apparatus may further determine whether the table information processing plug-in is triggered. Step 402 is performed if the table information processing plug-in is triggered. If the table information processing plug-in is not triggered, for example, software corresponding to the corresponding instant social platform is not installed with the table information processing plug-in, to send information corresponding to the to-be-exchanged table file to the corresponding receiving terminal, the information creation apparatus herein may invoke a system table information plug-in to convert the to-be-exchanged table file into a corresponding picture file, so as to send the picture file to the corresponding receiving terminal.

In step 402, the information creation apparatus receives the to-be-exchanged table file to be exchanged; specifically, may obtain the previously copied table file in the pasteboard according to the file pasting instruction by means of receiving the file pasting instruction; or obtain, according to the file dragging instruction by means of receiving the file dragging instruction, the to-be-exchanged table file that is dragged to the information sending interface. Subsequently, step 403 is performed.

In step 403, the information creation apparatus performs, on the information sending interface by using the table information processing plug-in, the presentation operation on the to-be-exchanged table file obtained in step 402. The information sending interface herein is an interface for the user to send the exchange information. In this step, the to-be-exchanged table file is directly presented on the information sending interface in a table file format, so that the user confirms content in the to-be-exchanged table file. Subsequently, step 404 is performed.

In step 404, the user may perform the editing operation on the to-be-exchanged table file presented in step 403 by using the information creation apparatus, such as adding or deleting a line or a column in the to-be-exchanged table file, or editing, deleting, or modifying data in the to-be-exchanged table file. Subsequently, step 405 is performed.

In step 405, the information creation apparatus receives the information creation instruction. The information creation instruction is an instruction for generating the corresponding exchange information according to the to-be-exchanged table file edited in step 404, so as to send the exchange information to the corresponding receiving terminal. Subsequently, the information creation apparatus converts the to-be-exchanged table file edited in step 404 into the exchange information according to the information creation instruction, so as to send the exchange information to the corresponding receiving terminal. In step 406, the information creation apparatus determines the receiving terminal of the exchange information obtained in step S205. Subsequently, step S207 is performed.

In step 407, the information creation apparatus determines whether the receiving terminal of the exchange information has the table information processing plug-in, where step S208 is performed if the receiving terminal has the table information processing plug-in; and step S209 is performed if the receiving terminal does not have the table information processing plug-in.

In step 408, the receiving terminal may effectively view the exchange information if the receiving terminal has the table information processing plug-in. Therefore, the information creation apparatus sends the exchange information to the receiving terminal.

In step 409, the receiving terminal possibly cannot effectively view the exchange information if the receiving terminal does not have the table information processing plug-in. Therefore, the information creation apparatus converts the to-be-exchanged table file in the exchange information into a picture file, and sends the converted exchange information to the receiving terminal, helping the receiving terminal to view.

Meanwhile, the information creation apparatus may further send a table information plug-in installation request to the receiving terminal if the receiving terminal does not have the table information processing plug-in, so that the receiving terminal is installed with the table information processing plug-in.

In this way, a process of creating the exchange information of the information creation method in this embodiment is completed.

By using the information creation method in this embodiment, the to-be-exchanged table file that is pasted or dragged to the information sending interface by the user may be received, and the exchange information may be converted according to a status of the table information processing plug-in of a sending terminal. The to-be-exchanged table file is presented in a table form by using the table information processing plug-in when the table information processing plug-in is triggered. The received to-be-exchanged table file is presented after being converted into a picture file when the table information processing plug-in is not triggered. Meanwhile, the to-be-exchanged table file may be performed with the editing operation, thereby further improving related table file communication efficiency.

Figure 5:
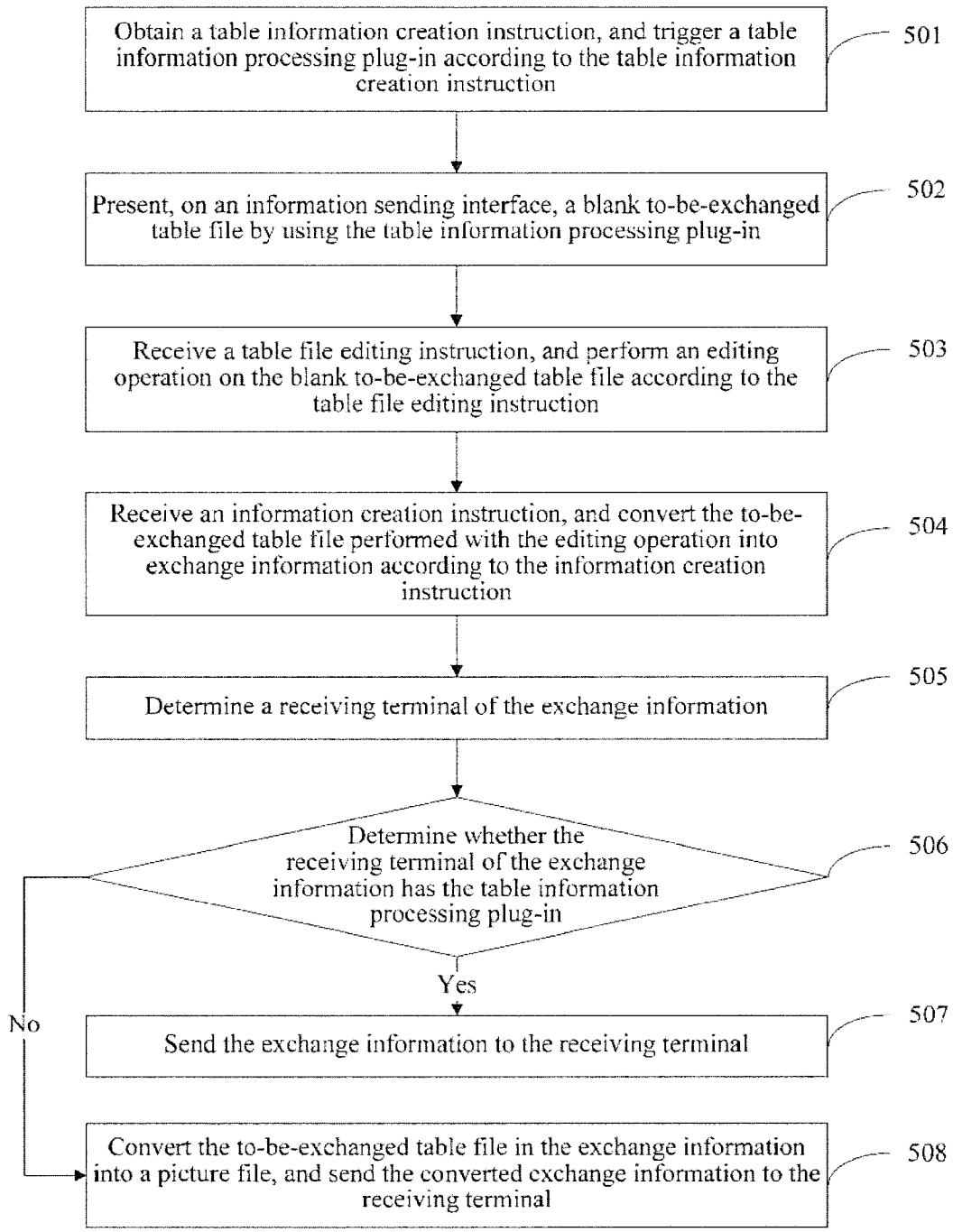
FIG. 5 is a flowchart of a second exemplary embodiment of an information creation method according to this application.

Referring to FIG. 5, FIG. 5 is a flowchart of still another embodiment of an information creation method according to this application. The information creation method in this embodiment may be implemented by using the foregoing electronic device. The information creation method includes:

Step 501: Obtain a table information creation instruction, and trigger a table information processing plug-in according to the table information creation instruction.

Step 502: Present, on an information sending interface, a blank to-be-exchanged table file by using the table information processing plug-in.

Step 503: Receive a table file editing instruction, and perform an editing operation on the blank to-be-exchanged table file by using the table information processing plug-in according to the table file editing instruction.

Step 504: Receive an information creation instruction, and convert the to-be-exchanged table file performed with the editing operation into exchange information according to the information creation instruction.

The following steps 505 to 508 are operations performed by the exchange server.

Step 505: Determine a receiving terminal of the exchange information.

Step 506: Determine whether the receiving terminal of the exchange information has the table information processing plug-in, where step 507 is performed if the receiving terminal has the table information processing plug-in; and step 508 is performed if the receiving terminal does not have the table information processing plug-in.

Step 507: Send the exchange information to the receiving terminal.

Step 508: Convert the to-be-exchanged table file in the exchange information into a picture file, and send the converted exchange information to the receiving terminal.

Specific processes of the steps of the information creation method according to this embodiment are described below in detail.

In step 501, the table information creation instruction is obtained by the information creation apparatus. The table information creation instruction is an instruction indicating that a user needs to create the to-be-exchanged table file. The to-be-exchanged table file is a table file that needs to be exchanged by users. The to-be-exchanged table file may be a table file that is made by excel and that is in an xls format, or may be a table file that is made by wps and that is an et format.

Subsequently, the information creation apparatus triggers the table information processing plug-in according to the table information creation instruction. The table information processing plug-in herein is a plug-in that is preset in a client of a corresponding instant social platform, and is configured to perform execution, presentation, and editing operations on the table file. Subsequently, step 502 is performed.

Figure 6:
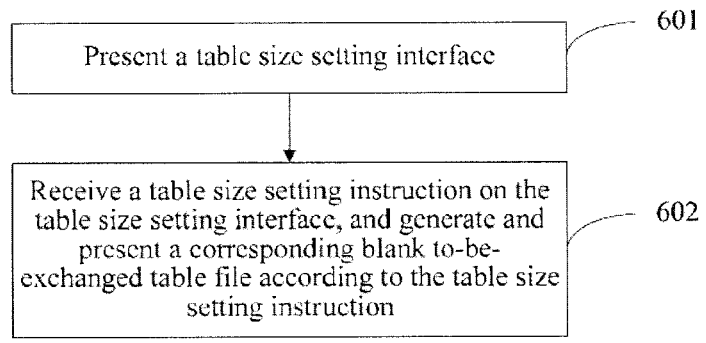
FIG. 6 is a flowchart of step 502 of a second exemplary embodiment of an information creation method according to this application.

In step 502, the information creation apparatus presents, on the information sending interface, the blank to-be-exchanged table file by using the table information processing plug-in. The information sending interface herein is an interface for the user to send the exchange information. In this step, the blank to-be-exchanged table file is directly presented on the information sending interface in a table file format, so that the user adds corresponding content into the to-be-exchanged table file. Referring to FIG. 6, FIG. 6 is a flowchart of step 502 in a second embodiment of an information creation method according to this application. Step 502 includes:

Step 601: The information creation apparatus presents a table size setting interface, the table size setting interface being used by a user to set a parameter of the to-be-exchanged table file, for example, set the numbers of lines and columns of the to-be-exchanged table file.

Step 602: The information creation apparatus receives, on the table size setting interface presented in step 601, a table size setting instruction sent by the user, and subsequently generates and presents a blank to-be-exchanged table file having the corresponding parameter according to the table size setting instruction. Subsequently, step 503 is performed.

In step 503, the information creation apparatus receives the table file editing instruction of the user. The table file editing instruction refers to an instruction for editing the content of the to-be-exchanged table file; and includes, but is not limited to at least one of a line adding instruction, a line deletion instruction, a line editing instruction, a column adding instruction, a column deletion instruction, and a column editing instruction.

In this way, the information creation apparatus may perform a line adding operation on the to-be-exchanged table file by using the line adding instruction; perform a line deletion operation on the to-be-exchanged table file by using the line deletion instruction; perform a column adding operation on the to-be-exchanged table file by using the column adding instruction; perform a column deletion operation on the to-be-exchanged table file by using the column deletion instruction; perform a line editing operation on the to-be-exchanged table file by using the line editing instruction; and perform a column editing operation on the to-be-exchanged table file by using the column editing instruction. Subsequently, step 504 is performed.

In step 504, the information creation apparatus receives the information creation instruction. The information creation instruction is an instruction for generating the corresponding exchange information according to the to-be-exchanged table file edited in step 503, so as to send the exchange information to the corresponding receiving terminal. Subsequently, the information creation apparatus converts the to-be-exchanged table file edited in step 503 into the exchange information according to the information creation instruction, so as to send the exchange information to the corresponding receiving terminal.

Figure 7:
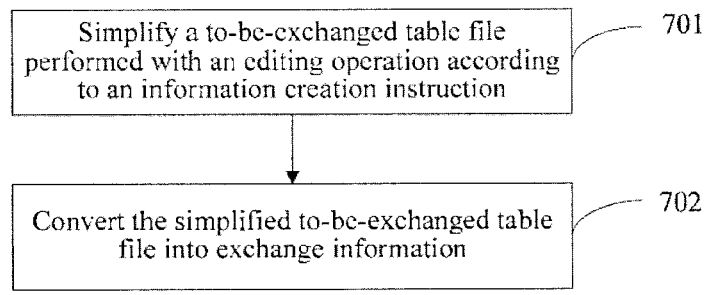
FIG. 7 is a flowchart of step 504 of a second exemplary embodiment of an information creation method according to this application.

Specifically, referring to FIG. 7, FIG. 7 is a flowchart of step 504 in the foregoing embodiment of this application. Step 504 includes:

Step 701: The information creation apparatus simplifies the to-be-exchanged table file performed with the editing operation by using the table information processing plug-in according to the information creation instruction. For a 5*5 to-be-exchanged table file, only a range of 3*3 has content. In this case, the information creation apparatus may convert the 5*5 to-be-exchanged table file into a 3*3 to-be-exchanged table file, helping the user to view more conveniently.

Step 702: The information creation apparatus converts the to-be-exchanged table file simplified in step 701 into the exchange information, so as to send the exchange information to a corresponding receiving terminal. Subsequently, step S505 is performed.

In step 505, the information creation apparatus determines the receiving terminal of the exchange information obtained in step 504. In step 506, the information creation apparatus determines whether the receiving terminal of the exchange information has the table information processing plug-in, where step 507 is performed if the receiving terminal has the table information processing plug-in; and step 508 is performed if the receiving terminal does not have the table information processing plug-in.

In step 507, the receiving terminal may effectively view the exchange information if the receiving terminal has the table information processing plug-in. Therefore, the information creation apparatus sends the exchange information to the receiving terminal.

In step 508, the receiving terminal possibly cannot effectively view the exchange information if the receiving terminal does not have the table information processing plug-in. Therefore, the information creation apparatus converts the to-be-exchanged table file in the exchange information into a picture file, and sends the converted exchange information to the receiving terminal, helping the receiving terminal to view.

Meanwhile, the information creation apparatus may further send a table information plug-in installation request to the receiving terminal if the receiving terminal does not have the table information processing plug-in, so that the receiving terminal is installed with the table information processing plug-in.

In this way, a process of creating the exchange information of the information creation method in this embodiment is completed.

By using the information creation method in this embodiment, the to-be-exchanged table file may be created on the information sending interface, and editing and simplifying operations may be performed on the to-be-exchanged table file, thereby further improving related table file communication efficiency.

Figure 8:
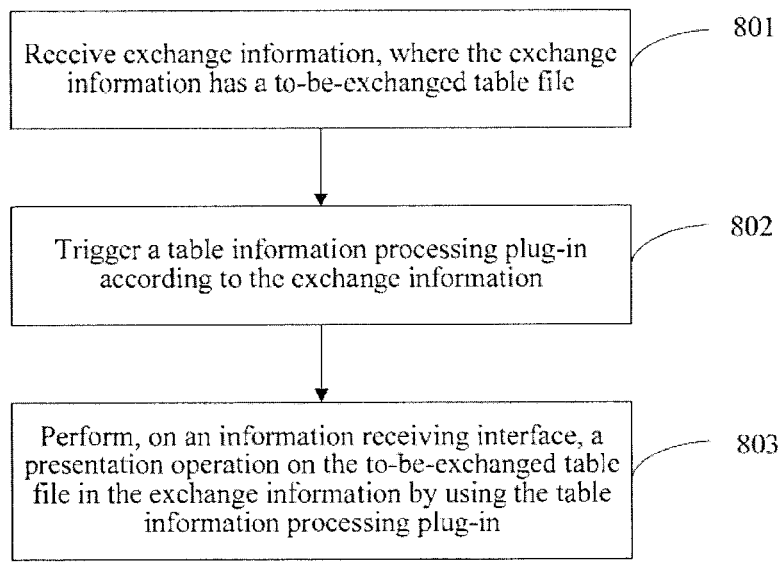
FIG. 8 is a flowchart of a third embodiment of an information creation method according to this application.

Referring to FIG. 8, FIG. 8 is a flowchart of still another embodiment of an information creation method according to this application. The information creation method in this embodiment may be implemented by using the foregoing electronic device of an information receiving end. The information creation method includes:

Step 801: Receive exchange information from an exchange server (or messaging server), where the exchange information includes a to-be-exchanged table file.

Step 802: Trigger a table information processing plug-in according to the exchange information.

Step 803: Perform, on an information receiving interface, a presentation operation on the to-be-exchanged table file in the exchange information by using the table information processing plug-in.

Specific processes of the steps of the information creation method according to this embodiment are described below in detail.

In step 801, the information creation apparatus in a social APP client may receive the exchange information that has the to-be-exchanged table file and that is sent by another terminal. Subsequently, step 802 is performed.

In step 802, the information creation apparatus triggers the table information processing plug-in according to the exchange information obtained in step 801. Subsequently, step 803 is performed.

In step 803, the information creation apparatus performs, on the information receiving interface by using the table information processing plug-in, the presentation operation on the to-be-exchanged table file in the exchange information obtained in step 801. The information receiving interface herein is an interface for the user to receive the exchange information. In this step, the to-be-exchanged table file is directly presented on the information receiving interface in a table file format, so that the user confirms content in the to-be-exchanged table file.

In this way, a process of processing the exchange information of the information creation method in this embodiment is completed.

By using the information creation method in this embodiment, the to-be-exchanged table file in the exchange information is presented on the information receiving interface, and a table file in a table format can be presented, thereby further improving related table file communication efficiency.

Figure 9:
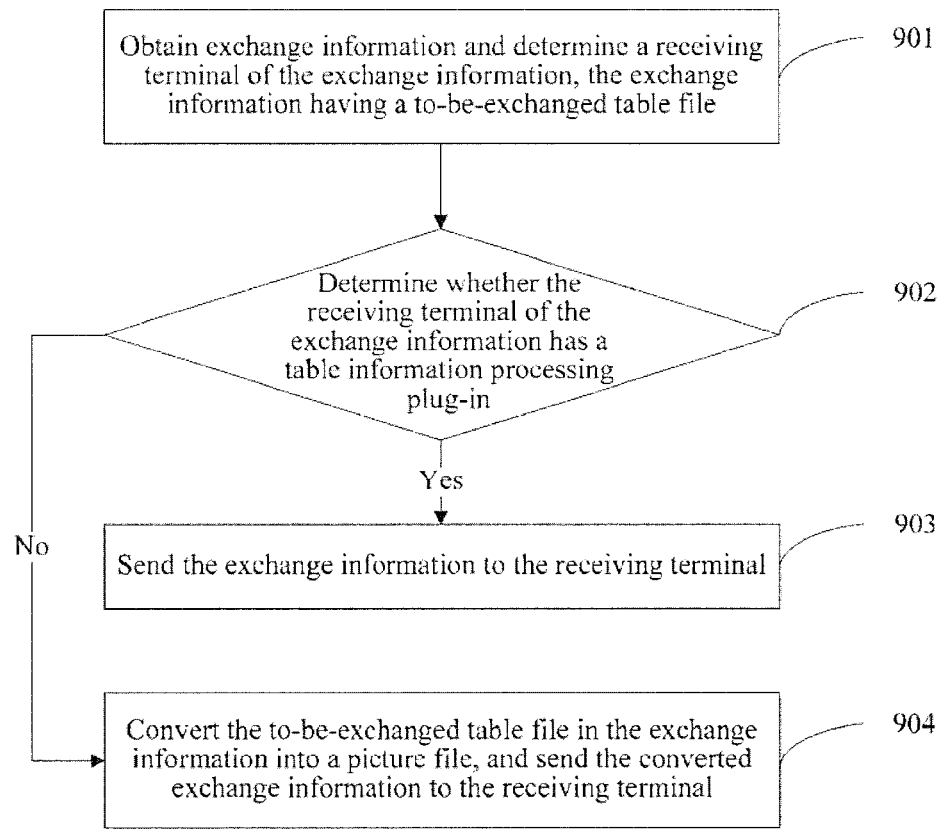
FIG. 9 is a flowchart of an embodiment of an information sending method according to this application.

This application further provides an information sending method. Referring to FIG. 9, FIG. 9 is a flowchart of an embodiment of the information sending method according to this application. The information sending method in this embodiment may be applied to the foregoing exchange server. The information sending method includes:

Step 901: Obtain exchange information and determine a receiving terminal of the exchange information, the exchange information having a to-be-exchanged table file.

Step 902: Determine whether the receiving terminal of the exchange information has a table information processing plug-in, where step 903 is performed if the receiving terminal has the table information processing plug-in; and step 904 is performed if the receiving terminal does not have the table information processing plug-in.

Step 903: Send the exchange information to the receiving terminal.

Step 904: Convert the to-be-exchanged table file in the exchange information into a picture file, and send the converted exchange information to the receiving terminal.

Specific processes of the steps of the information sending method according to this embodiment are described below in detail.

In step 901, an information sending apparatus obtains the exchange information from a sending terminal of the exchange information. The exchange information includes an identifier of the receiving terminal. The exchange server determines the receiving terminal of the exchange information according to the identifier of the receiving terminal. Subsequently, step 902 is performed.

In step 902, the information sending apparatus in the exchange server determines whether the receiving terminal of the exchange information has the table information processing plug-in, where step 903 is performed if the receiving terminal has the table information processing plug-in; and step 904 is performed if the receiving terminal does not have the table information processing plug-in. The exchange server first sends a request to the receiving terminal to request to send the to-be-exchanged table file to the receiving terminal. The exchange server receives a value returned by the receiving terminal, and may determine, according to the returned value, whether a social APP of the receiving terminal has the table information processing plug-in. Alternatively, when the receiving terminal logs in to the social APP and sends a login request to the exchange server, the request includes a version of the social APP, and the exchange server saves the identifier of the receiving terminal and the version of the corresponding social APP. The exchange information that is of the sending terminal and that is received by the exchange server includes the identifier of the receiving terminal. A version number of the corresponding social APP is searched according to the identifier of the receiving terminal. Whether the social APP of the receiving terminal has the table information processing plug-in may be determined according to the version number.

In step 903, the receiving terminal may effectively view the exchange information if the receiving terminal has the table information processing plug-in. Therefore, the information sending apparatus in the exchange server sends the exchange information to the receiving terminal.

In step 904, the receiving terminal possibly cannot effectively view the exchange information if the receiving terminal does not have the table information processing plug-in. Therefore, the information sending apparatus in the exchange server converts the to-be-exchanged table file in the exchange information into a picture file, and sends the converted exchange information to the receiving terminal, helping the receiving terminal to view.

Meanwhile, the information sending apparatus may further send a table information plug-in installation request to the receiving terminal if the receiving terminal does not have the table information processing plug-in, so that the receiving terminal is installed with the table information processing plug-in.

In this way, a process of sending the exchange information of the information sending method in this embodiment is completed.

By using the information sending method in this embodiment, the exchange information may be pre-converted according to a plug-in status of the receiving terminal, so that the receiving terminal can view quickly, thereby further improving related table file communication efficiency.

Figure 10:
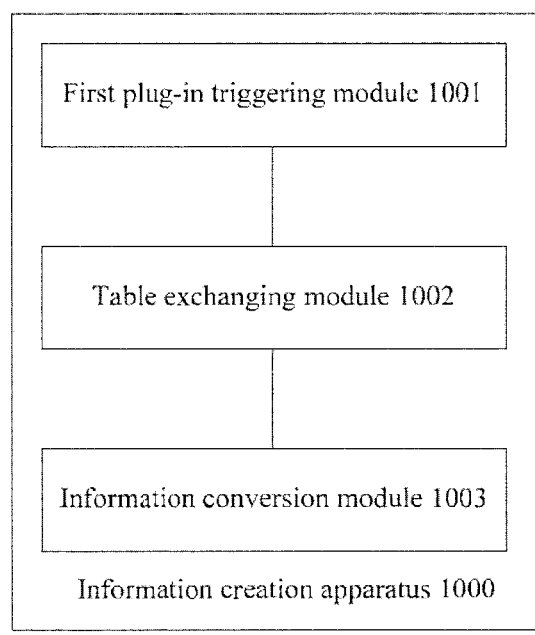
FIG. 10 is a schematic structural diagram of an information creation apparatus according to an embodiment of this application.

This application further provides an information creation apparatus 1000, as shown in FIG. 10, including:

a first plug-in triggering module 1001, configured to obtain a table information creation instruction, and trigger a table information processing plug-in according to the table information creation instruction;

a table exchanging module 1002, configured to obtain a to-be-exchanged table file by using the table information processing plug-in, and present the to-be-exchanged table file on an information sending interface; and an information conversion module 1003, configured to receive an information creation instruction, and convert the to-be-exchanged table file that is being presented into exchange information according to the information creation instruction.

By using the information creation apparatus provided in this embodiment of this application, on the information sending interface in a client of a social APP, a table file in a table format is obtained and presented by invoking the table information processing plug-in; text content in the table file may be presented on the information sending interface; and the table file may further be edited, thereby improving table file communication efficiency.

Figure 11:
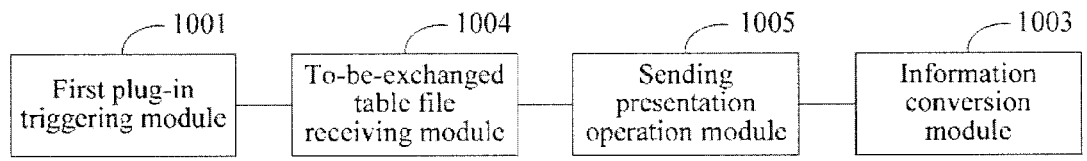
FIG. 11 is a schematic structural diagram of a first embodiment of an information creation apparatus according to this application.

In some embodiments, as shown in FIG. 11, the table exchanging module 1002 in the information creation apparatus provided in this application includes a to-be-exchanged table file receiving module 1004 and a sending presentation operation module 1005.

The first plug-in triggering module 1001 is configured to obtain the table information creation instruction, and trigger the table information processing plug-in according to the table information creation instruction. The to-be-exchanged table file receiving module 1004 is configured to receive the to-be-exchanged table file. The sending presentation operation module 1005 is configured to perform, on the information sending interface, the presentation operation on the to-be-exchanged table file by using the table information processing plug-in. The information conversion module 1003 is configured to receive the information creation instruction, and convert the to-be-exchanged table file that is being presented into the exchange information according to the information creation instruction.

When the information creation apparatus in this embodiment is used, the first plug-in triggering module 1001 first obtains the table information creation instruction. The table information creation instruction is an instruction indicating that a user needs to create the to-be-exchanged table file. The to-be-exchanged table file is a table file that needs to be exchanged by users. The to-be-exchanged table file may be a table file that is made by excel and that is in an xls format, or may be a table file that is made by wps and that is an et format.

Subsequently, the first plug-in triggering module 1001 triggers the table information processing plug-in according to the table information creation instruction. The table information processing plug-in herein is a plug-in that is preset in a client of a corresponding instant social platform, and is configured to perform creation, presentation, and editing operations on the table file.

Subsequently, the to-be-exchanged table file receiving module 1004 receives the to-be-exchanged table file to be exchanged.

Subsequently, the sending presentation operation module 1005 performs, on the information sending interface by using the table information processing plug-in, the presentation operation on the to-be-exchanged table file obtained by the to-be-exchanged table file receiving module 1004. The information sending interface herein is an interface for the user to send the exchange information. In this step, the to-be-exchanged table file is directly presented on the information sending interface in a table file format, so that the user confirms content in the to-be-exchanged table file.

Finally, the information conversion module 1003 receives the information creation instruction. The information creation instruction is an instruction for generating the corresponding exchange information according to the to-be-exchanged table file presented by the sending presentation operation module, so as to send the exchange information to a corresponding receiving terminal. Subsequently, the information conversion module 1003 converts the to-be-exchanged table file presented by the sending presentation operation module into the exchange information according to the information creation instruction, so as to send the exchange information to the corresponding receiving terminal.

In this way, a process of creating the exchange information of the information creation apparatus in this embodiment is completed.

By using the information creation apparatus in this embodiment, on the information sending interface, presentation and editing operations are performed on the to-be-exchanged table file, and exchange information having the table file may be sent, thereby improving related table file communication efficiency.

Figure 12:
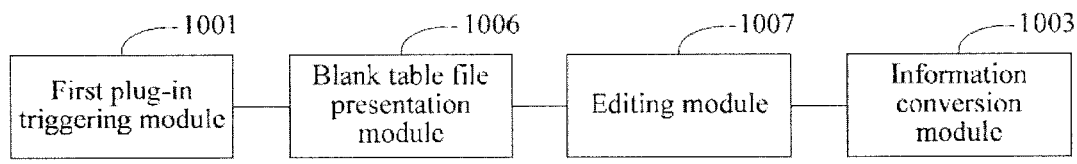
FIG. 12 is a schematic structural diagram of a second embodiment of an information creation apparatus according to this application.

In some embodiments, as shown in FIG. 12, the table exchanging module 1002 in the information creation apparatus provided in this application includes a blank table file presentation module 1006 and an editing module 1007.

The first plug-in triggering module 1001 is configured to obtain the table information creation instruction, and trigger the table information processing plug-in according to the table information creation instruction. The blank table file presentation module 1006 is configured to present, on the information sending interface, a blank to-be-exchanged table file by using the table information processing plug-in. The editing module 1007 is configured to receive a table file editing instruction, and perform an editing operation on the blank to-be-exchanged table file by using the table information processing plug-in according to the table file editing instruction. The information conversion module 1003 is configured to receive the information creation instruction, and convert the to-be-exchanged table file performed with the editing operation into the exchange information according to the information creation instruction.

When the information creation apparatus in this embodiment is used, the first plug-in triggering module 1001 first obtains the table information creation instruction. The table information creation instruction is an instruction indicating that a user needs to create the to-be-exchanged table file. The to-be-exchanged table file is a table file that needs to be exchanged by users. The to-be-exchanged table file may be a table file that is made by excel and that is in an xls format, or may be a table file that is made by wps and that is an et format.

Subsequently, the first plug-in triggering module 1001 triggers the table information processing plug-in according to the table information creation instruction. The table information processing plug-in herein is a plug-in that is preset in a client of a corresponding instant social platform, and is configured to perform creation, presentation, and editing operations on the table file.

Subsequently, the blank table file presentation module 1006 presents a blank to-be-exchanged table file by using the table information processing plug-in triggered by the first plug-in triggering module 1001, so that the user fills in content of the table file.

Subsequently, the editing module 1007 receives a table file editing instruction. The table file editing instruction refers to an instruction instructing the user to edit content of the blank to-be-exchanged table file. Subsequently, the editing module 1007 performs, according to the table file editing instruction by using the table information processing plug-in, an editing operation on the blank to-be-exchanged table file presented by the blank table file presentation module, and presents, on the information sending interface, the edited to-be-exchanged table file in a table format by using the table information processing plug-in. Meanwhile, the user confirms content in the to-be-exchanged table file.

Finally, the information conversion module 1003 receives the information creation instruction. The information creation instruction is an instruction for generating the corresponding exchange information according to the to-be-exchanged table file presented by the editing module, so as to send the exchange information to an exchange server, and send the exchange information to the corresponding receiving terminal by using the exchange server. Subsequently, the information conversion module 1003 converts the to-be-exchanged table file edited by the editing module 1007 into the exchange information according to the information creation instruction, so as to send the exchange information to the corresponding receiving terminal.

In this way, a process of creating the exchange information of the information creation apparatus in this embodiment is completed.

By using the information creation apparatus in this embodiment, on the information sending interface, creation, presentation, and editing operations are performed on the blank to-be-exchanged table file, and exchange information having the table file may be sent, thereby improving related table file communication efficiency.

Figure 13:
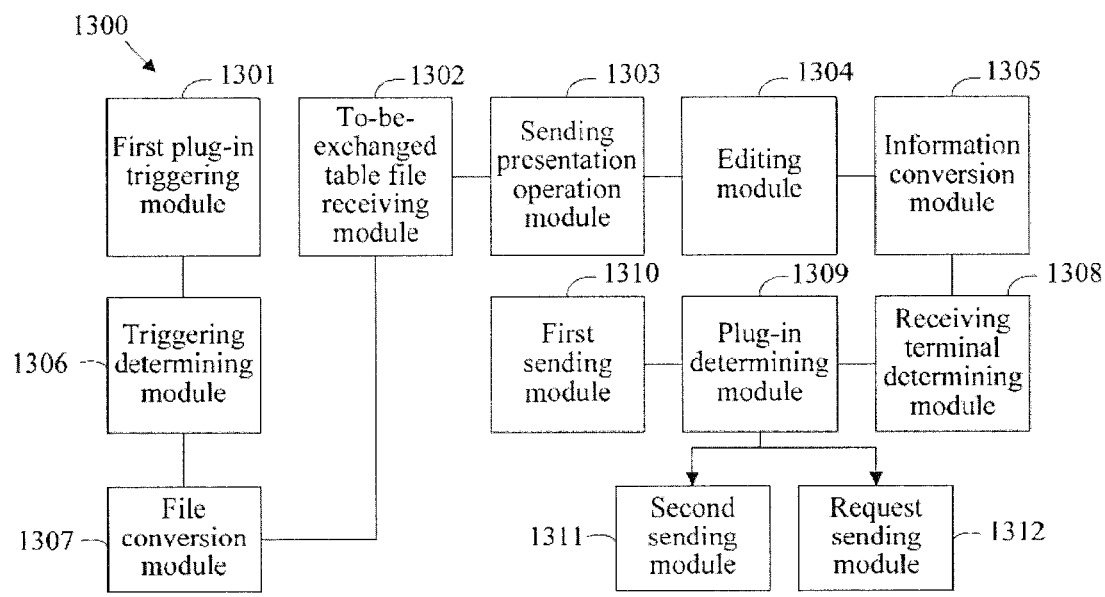
FIG. 13 is a schematic structural diagram of a first exemplary embodiment of an information creation apparatus according to this application.

In some embodiments, for a further extension of the information creation apparatus in FIG. 11, the information creation apparatus 1300 in this embodiment, as shown in FIG. 13, includes: a first plug-in triggering module 1301, a to-be-exchanged table file receiving module 1302, a sending presentation operation module 1303, an editing module 1304, an information conversion module 1305, a triggering determining module 1306, and a file conversion module 1307. An information creation apparatus in an exchange server includes a receiving terminal determining module 1308, a plug-in determining module 1309, a first sending module 1310, a second sending module 1311, and a request sending module 1312.

The first plug-in triggering module 1301 is configured to obtain a table information creation instruction, and trigger a table information processing plug-in according to the table information creation instruction. The to-be-exchanged table file receiving module 1302 is configured to receive a to-be-exchanged table file. The sending presentation operation module 1303 is configured to perform, on an information sending interface, a presentation operation on the to-be-exchanged table file by using the table information processing plug-in. The editing module 1304 is configured to perform an editing operation on the to-be-exchanged table file that is being presented. The information conversion module 1305 is configured to convert the edited to-be-exchanged table file into exchange information. The triggering determining module 1306 is configured to determine whether the table information processing plug-in is triggered. The file conversion module 1307 is configured to invoke a system table information plug-in when the table information processing plug-in is not triggered, to convert the to-be-exchanged table file into a corresponding picture file.

The receiving terminal determining module 1308 is configured to determine the receiving terminal of the exchange information. The plug-in determining module 1309 is configured to determine whether the receiving terminal of the exchange information has the table information processing plug-in. The first sending module 1310 is configured to send the exchange information to the receiving terminal if the receiving terminal has the table information processing plug-in. The sending module 1311 is configured to convert the to-be-exchanged table file in the exchange information into a picture file, and send the converted exchange information to the receiving terminal if the receiving terminal does not have the table information processing plug-in. The request sending module 1312 is configured to send a table information processing plug-in installation request to the receiving terminal if the receiving terminal does not have the table information processing plug-in, so that the receiving terminal is installed with the table information processing plug-in.

Figure 14:
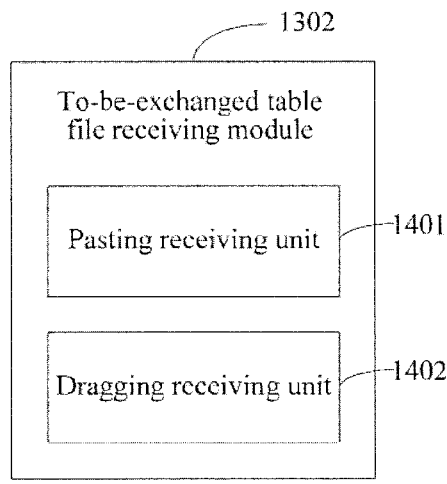
FIG. 14 is a schematic structural diagram of a to-be-exchanged table file receiving module in a first exemplary embodiment of an information creation apparatus according to this application.

Referring to FIG. 14, FIG. 14 is a schematic structural diagram of the to-be-exchanged table file receiving module 1302 in the information creation apparatus 1300 shown in FIG. 13 according to an embodiment of this application. The to-be-exchanged table file receiving module 1302 includes a pasting receiving unit 1401 and a dragging receiving unit 1402. The pasting receiving unit 1401 is configured to receive a file pasting instruction, and obtain a previously copied table file in a pasteboard according to the file pasting instruction. The dragging receiving unit 1402 is configured to receive a file dragging instruction, and obtain, according to the file dragging instruction, the to-be-exchanged table file that is dragged to the information sending interface.

When the information creation apparatus in this embodiment is used, the first plug-in triggering module 1301 first obtains the table information creation instruction. The table information creation instruction is an instruction indicating that a user needs to create the to-be-exchanged table file. The to-be-exchanged table file is a table file that needs to be exchanged by users. The to-be-exchanged table file may be a table file that is made by excel and that is in an xls format, or may be a table file that is made by wps and that is an et format.

Subsequently, the first plug-in triggering module 1301 triggers the table information processing plug-in according to the table information creation instruction. The table information processing plug-in herein is a plug-in that is preset in a client of a corresponding instant social platform, and is configured to perform creation, presentation, and editing operations on the table file.

In this step, the triggering determining module 1306 may further determine whether the table information processing plug-in is triggered. The to-be-exchanged table file receiving module 1302 is switched to if the table information processing plug-in is triggered. If the table information processing plug-in is not triggered, for example, software corresponding to the corresponding instant social platform is not installed with the table information processing plug-in, to send information corresponding to the to-be-exchanged table file to the corresponding receiving terminal, the file conversion module 1307 herein may invoke the table information plug-in to convert the to-be-exchanged table file into a corresponding picture file, so as to send the picture file to the corresponding receiving terminal by using an exchange server.

Subsequently, the to-be-exchanged table file receiving module 1302 receives the to-be-exchanged table file to be exchanged. Specifically, the to-be-exchanged table file receiving module 1302 may receive the file pasting instruction by using the pasting receiving unit 1401, and obtain the previously copied table file in the pasteboard according to the file pasting instruction; or receive the file dragging instruction by using the dragging receiving unit 1402, and obtain, according to the file dragging instruction, the to-be-exchanged table file that is dragged to the information sending interface.

Subsequently, the sending presentation operation module 1303 performs, on the information sending interface by using the table information processing plug-in, the presentation operation on the to-be-exchanged table file obtained by the to-be-exchanged table file receiving module 1302. The information sending interface herein is an interface for the user to send the exchange information. In this step, the to-be-exchanged table file is directly presented on the information sending interface in a table file format, so that the user confirms content in the to-be-exchanged table file.

Subsequently, the user may perform, by using the editing module 1304, an editing operation on the to-be-exchanged table file presented by the sending presentation operation module 1303, for example, add or delete a line or a column of the table file, or add, delete, or modify text content or data in the table file.

Subsequently, the information conversion module 1305 receives the information creation instruction. The information creation instruction is an instruction for generating the corresponding exchange information according to the to-be-exchanged table file edited by the editing module, so as to send the exchange information to the corresponding receiving terminal by using the exchange server. Subsequently, the information conversion module 1305 converts the to-be-exchanged table file edited by the editing module 1304 into the exchange information according to the information creation instruction, so as to send the exchange information to the corresponding receiving terminal.

Subsequently, the receiving terminal determining module 1308 determines the receiving terminal of the exchange information obtained by the information conversion module 1305.

Subsequently, the plug-in determining module 1309 determines whether the receiving terminal of the exchange information has the table information processing plug-in. The receiving terminal may effectively view the exchange information if the receiving terminal has the table information processing plug-in. Therefore, the first sending module 1310 directly sends the exchange information to the receiving terminal. The receiving terminal possibly cannot effectively view the exchange information if the receiving terminal does not have the table information processing plug-in. Therefore, the second sending module 1311 converts the to-be-exchanged table file in the exchange information into the picture file, and sends the converted exchange information to the receiving terminal, helping the receiving terminal to view.

Meanwhile, the request sending module 1312 may further send a table information plug-in installation request to the receiving terminal if the receiving terminal does not have the table information processing plug-in, so that the receiving terminal is installed with the table information processing plug-in.

In this way, a process of creating the exchange information of the information creation apparatus in this embodiment is completed.

By using the information creation apparatus in this embodiment, the to-be-exchanged table file may be performed with the editing operation, and the exchange information may be pre-converted according to a plug-in status of a sending terminal. The exchange information is sent to the receiving terminal by using the exchange server, so that the receiving terminal can view quickly, thereby further improving the related table file communication efficiency.

Figure 15:
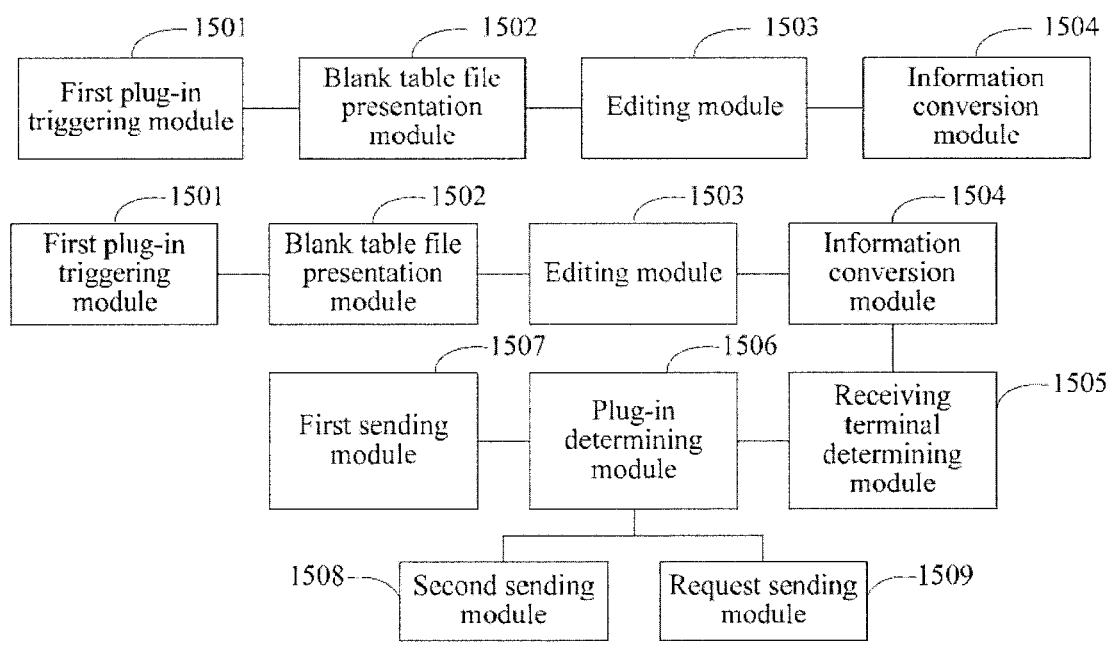
FIG. 15 is a schematic structural diagram of a second exemplary embodiment of an information creation apparatus according to this application.

In some embodiments, for a further extension of the information creation apparatus in FIG. 12, the information creation apparatus 1500 in this embodiment, as shown in FIG. 15, includes: a first plug-in triggering module 1501, a blank table file presentation module 1502, an editing module 1503, and an information conversion module 1504. An information creation apparatus in an exchange server includes: a receiving terminal determining module 1505, a plug-in determining module 1506, a first sending module 1507, a second sending module 1508, and a request sending module 1509.

The first plug-in triggering module 1501 is configured to obtain the table information creation instruction, and trigger the table information processing plug-in according to the table information creation instruction. The blank table file presentation module 1502 is configured to present, on the information sending interface, a blank to-be-exchanged table file by using the table information processing plug-in. The editing module 1503 is configured to receive the table file editing instruction, and perform the editing operation on the blank to-be-exchanged table file by using the table information processing plug-in according to the table file editing instruction. The information conversion module 1504 is configured to receive the information creation instruction, and convert the to-be-exchanged table file performed with the editing operation into the exchange information according to the information creation instruction.

The receiving terminal determining module 1505 is configured to determine the receiving terminal of the exchange information. The plug-in determining module 1506 is configured to determine whether the receiving terminal of the exchange information has the table information processing plug-in. The first sending module 1507 is configured to send the exchange information to the receiving terminal if the receiving terminal has the table information processing plug-in. The sending module 1508 is configured to convert the to-be-exchanged table file in the exchange information into a picture file, and send the converted exchange information to the receiving terminal if the receiving terminal does not have the table information processing plug-in. The request sending module 1509 is configured to send the table information processing plug-in installation request to the receiving terminal if the receiving terminal does not have the table information processing plug-in, so that the receiving terminal is installed with the table information processing plug-in.

Figure 16:
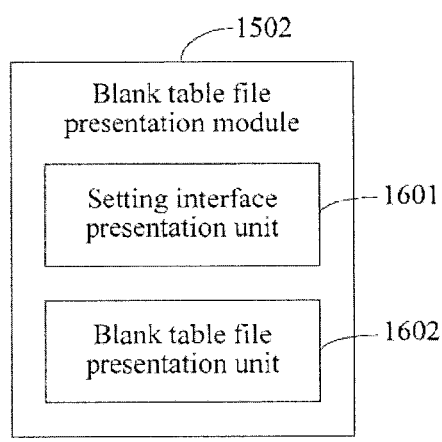
FIG. 16 is a schematic structural diagram of a blank table file presentation module in a second exemplary embodiment of an information creation apparatus according to this application.

Referring to FIG. 16, FIG. 16 is a schematic structural diagram of the blank table file presentation module 1502 in the information creation apparatus shown in FIG. 15 according to an embodiment of this application. The blank table file presentation module 1502 includes a setting interface presentation unit 1601 and a blank table file presentation unit 1602.

The setting interface presentation unit 1601 is configured to present a table size setting interface. The blank table file presentation unit 1602 is configured to receive a table size setting instruction on the table size setting interface, and generate and present a corresponding blank to-be-exchanged table file according to the table size setting instruction.

Figure 17:
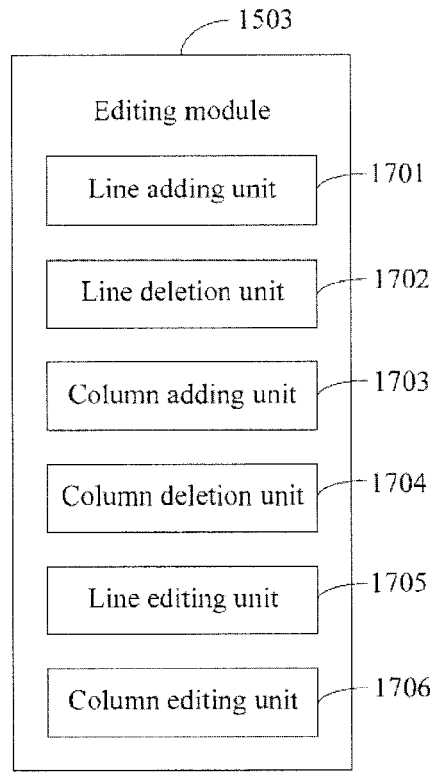
FIG. 17 is a schematic structural diagram of an editing module in a second exemplary embodiment of an information creation apparatus according to this application.

Referring to FIG. 17, FIG. 17 is a schematic structural diagram of the editing module 1503 in the information creation apparatus shown in FIG. 15 according to an embodiment of this application. The editing module 1503 includes a line adding unit 1701, a line deletion unit 1702, a column adding unit 1703, a column deletion unit 1704, a line editing unit 1705, and a column editing unit 1706.

The line adding unit 1701 is configured to perform a line adding operation on the to-be-exchanged table file by using the line adding instruction. The line deletion unit 1702 is configured to perform a line deletion operation on the to-be-exchanged table file by using the line deletion instruction. The column adding unit 1703 is configured to perform a column adding operation on the to-be-exchanged table file by using the column adding instruction. The column deletion unit 1704 is configured to perform a column deletion operation on the to-be-exchanged table file by using the column deletion instruction. The line editing unit 1705 is configured to perform a line editing operation on the to-be-exchanged table file by using the line editing instruction. The column editing unit 1706 is configured to perform a column editing operation on the to-be-exchanged table file by using the column editing instruction.

Figure 18:
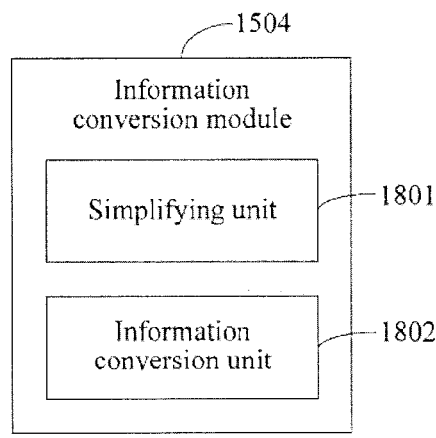
FIG. 18 is a schematic structural diagram of an information conversion module in a second exemplary embodiment of an information creation apparatus according to this application.

Referring to FIG. 18, FIG. 18 is a schematic structural diagram of the information conversion module 1504 in the information creation apparatus shown in FIG. 15 according to an embodiment of this application. The information conversion module 1504 includes a simplifying unit 1801 and an information conversion unit 1802.

The simplifying unit 1801 is configured to simplify the to-be-exchanged table file performed with the editing operation by using the table information processing plug-in according to the information creation instruction. The information conversion unit 1802 is configured to convert the simplified to-be-exchanged table file into the exchange information.

When the information creation apparatus in this embodiment is used, the first plug-in triggering module 1501 first obtains the table information creation instruction. The table information creation instruction is an instruction indicating that a user needs to create the to-be-exchanged table file. The to-be-exchanged table file is a table file that needs to be exchanged by users. The to-be-exchanged table file may be a table file that is made by excel and that is in an xls format, or may be a table file that is made by wps and that is an et format.

Subsequently, the first plug-in triggering module 1501 triggers the table information processing plug-in according to the table information creation instruction. The table information processing plug-in herein is a plug-in that is preset in a client of a corresponding instant social platform, and is configured to perform execution, presentation, and editing operations on the table file.

Subsequently, the blank table file presentation module 1802 presents, on the information sending interface, the blank to-be-exchanged table file by using the table information processing plug-in. The information sending interface herein is an interface for the user to send the exchange information. In this step, the blank to-be-exchanged table file is directly presented on the information sending interface in a table file format, so that the user adds corresponding content into the to-be-exchanged table file. For example:

The setting interface presentation unit 1601 of the blank table file presentation module 1502 presents the table size setting interface. The table size setting interface is used by the user to set a parameter of the to-be-exchanged table file, for example, set the numbers of lines and columns of the to-be-exchanged table file.

The blank table file presentation unit 1602 of the blank table file presentation module 1502 receives the table size setting instruction sent by the user on the table size setting interface presented on the setting interface presentation unit 1601, and then generates and presents a corresponding blank to-be-exchanged table file having the corresponding parameter according to the table size setting instruction.

Subsequently, the editing module 1503 receives the table file editing instruction of the user. The table file editing instruction refers to an instruction for editing the content of the to-be-exchanged table file; and includes, but is not limited to at least one of a line adding instruction, a line deletion instruction, a line editing instruction, a column adding instruction, a column deletion instruction, and a column editing instruction.

In this way, the line adding unit 1701 of the editing module 1503 may perform a line adding operation on the to-be-exchanged table file by using the line adding instruction. The line deletion unit 1702 may perform a line deletion operation on the to-be-exchanged table file by using the line deletion instruction. The column adding unit 1703 may perform a column adding operation on the to-be-exchanged table file by using the column adding instruction. The column deletion unit 1704 may perform a column deletion operation on the to-be-exchanged table file by using the column deletion instruction. The line editing unit 1705 may perform a line editing operation on the to-be-exchanged table file by using the line editing instruction. The column editing unit 1706 may perform a column editing operation on the to-be-exchanged table file by using the column editing instruction.

Subsequently, the information conversion module 1504 receives the information creation instruction. The information creation instruction is an instruction for generating the corresponding exchange information according to the to-be-exchanged table file edited by the editing module, so as to send the exchange information to the corresponding receiving terminal by using the exchange server. Subsequently, the information conversion module 1504 converts the to-be-exchanged table file edited by the editing module into the exchange information according to the information creation instruction, so as to send the exchange information to the exchange server, and send the exchange information to the corresponding receiving terminal by using the exchange server. For example:

The simplifying unit 1801 of the information conversion module 1504 simplifies the to-be-exchanged table file performed with the editing operation by using the table information processing plug-in according to the information creation instruction. For a 5*5 to-be-exchanged table file, only a range of 3*3 has content. In this case, the simplifying unit 1801 may convert the 5*5 to-be-exchanged table file into a 3*3 to-be-exchanged table file, helping the user to view more conveniently.

The information conversion unit 1802 of the information conversion module 1504 converts the simplified to-be-exchanged table file into the exchange information, so as to send the exchange information to the corresponding receiving terminal.

Subsequently, the receiving terminal determining module 1505 determines the receiving terminal of the exchange information obtained by the information conversion module.

Subsequently, the plug-in determining module 1506 determines whether the receiving terminal of the exchange information has the table information processing plug-in. The receiving terminal may effectively view the exchange information if the receiving terminal has the table information processing plug-in. Therefore, the first sending module 1507 directly sends the exchange information to the receiving terminal. The receiving terminal possibly cannot effectively view the exchange information if the receiving terminal does not have the table information processing plug-in. Therefore, the second sending module 1508 converts the to-be-exchanged table file in the exchange information into a picture file, and sends the converted exchange information to the receiving terminal, helping the receiving terminal to view.

Meanwhile, the request sending module 1509 may further send a table information plug-in installation request to the receiving terminal if the receiving terminal does not have the table information processing plug-in, so that the receiving terminal is installed with the table information processing plug-in.

In this way, a process of creating the exchange information of the information creation apparatus in this embodiment is completed.

By using the information creation apparatus in this embodiment, a creation operation, an editing operation, and a simplification operation may be performed on the to-be-exchanged table file, thereby further improving related table file communication efficiency.

Figure 19:
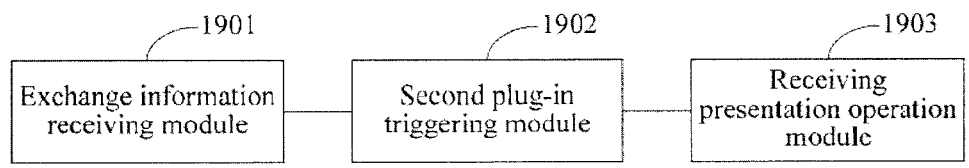
FIG. 19 is a schematic structural diagram of a third embodiment of an information creation apparatus according to this application.

In some embodiments, the information creation apparatus provided in this application, as shown in FIG. 19, further includes an exchange information receiving module 1901, a second plug-in triggering module 1902, and a receiving presentation operation module 1903.

The exchange information receiving module 1901 is configured to receive the exchange information, the exchange information having the to-be-exchanged table file. The second plug-in triggering module 1902 is configured to trigger the table information processing plug-in according to the exchange information. The receiving presentation operation module 1903 is configured to perform, on an information receiving interface, a presentation operation on the to-be-exchanged table file in the exchange information by using the table information processing plug-in.

When the information creation apparatus in this embodiment is used, the exchange information receiving module 1901 may first receive the exchange information that has the to-be-exchanged table file and that is sent out by another terminal.

Subsequently, the second plug-in triggering module 1902 triggers the table information processing plug-in according to the exchange information obtained by the exchange information receiving module 1901.

Finally, the receiving presentation operation module 1903 performs, on the information receiving interface by using the table information processing plug-in, the presentation operation on the to-be-exchanged table file in the exchange information obtained by the exchange information receiving module. The information receiving interface herein is an interface for the user to receive the exchange information. In this step, the to-be-exchanged table file is directly presented on the information receiving interface in a table file format, so that the user confirms content in the to-be-exchanged table file.

In this way, a process of processing the exchange information of the information creation apparatus in this embodiment is completed.

By using the information creation apparatus in this embodiment, the to-be-exchanged table file in the exchange information is presented on the information receiving interface, thereby further improving related table file communication efficiency.

Figure 20:
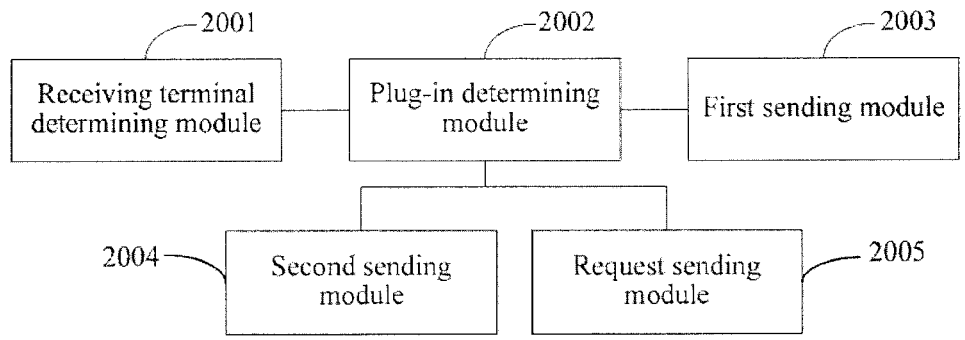
FIG. 20 is a schematic structural diagram of an embodiment of an information sending apparatus according to this application.

This application further provides an information sending apparatus 2000. Referring to FIG. 20, FIG. 20 is a schematic structural diagram of an embodiment of the information sending apparatus according to this application. The information sending apparatus 2000 in this embodiment may be implemented by using the embodiments of the foregoing information sending method. The information sending apparatus 2000 in this embodiment includes a receiving terminal determining module 2001, a plug-in determining module 2002, a first sending module 2003, a second sending module 2004, and a request sending module 2005.

The receiving terminal determining module 2001 is configured to obtain exchange information and determine a receiving terminal of the exchange information, the exchange information having a to-be-exchanged table file. The plug-in determining module 2002 is configured to determine whether the receiving terminal of the exchange information has a table information processing plug-in. The first sending module 2003 is configured to send the exchange information to the receiving terminal when the receiving terminal has the table information processing plug-in. The second sending module 2004 is configured to convert the to-be-exchanged table file in the exchange information into a picture file, and send the converted exchange information to the receiving terminal when the receiving terminal does not have the table information processing plug-in. The request sending module 2005 is configured to send a table information processing plug-in installation request to the receiving terminal if the receiving terminal does not have the table information processing plug-in, so that the receiving terminal is installed with the table information processing plug-in.

When the information sending apparatus in this embodiment is used, the receiving terminal determining module 2001 first obtains the exchange information from a sending terminal of the exchange information, and determines the receiving terminal of the exchange information.

Subsequently, the plug-in determining module 2002 determines whether the receiving terminal of the exchange information has the table information processing plug-in. The receiving terminal may effectively view the exchange information if the receiving terminal has the table information processing plug-in. Therefore, the first sending module 2003 sends the exchange information to the receiving terminal. The receiving terminal possibly cannot effectively view the exchange information if the receiving terminal does not have the table information processing plug-in. Therefore, the second sending module 2004 converts the to-be-exchanged table file in the exchange information into the picture file, and sends the converted exchange information to the receiving terminal, helping the receiving terminal to view.

Meanwhile, the request sending module 2005 may further send a table information plug-in installation request to the receiving terminal if the receiving terminal does not have the table information processing plug-in, so that the receiving terminal is installed with the table information processing plug-in.

In this way, a process of sending the exchange information of the information sending apparatus in this embodiment is completed.

By using the information sending apparatus in this embodiment, the exchange information may be pre-converted according to a plug-in status of the receiving terminal, so that the receiving terminal can view quickly, thereby further improving related table file communication efficiency.

Figure 21:
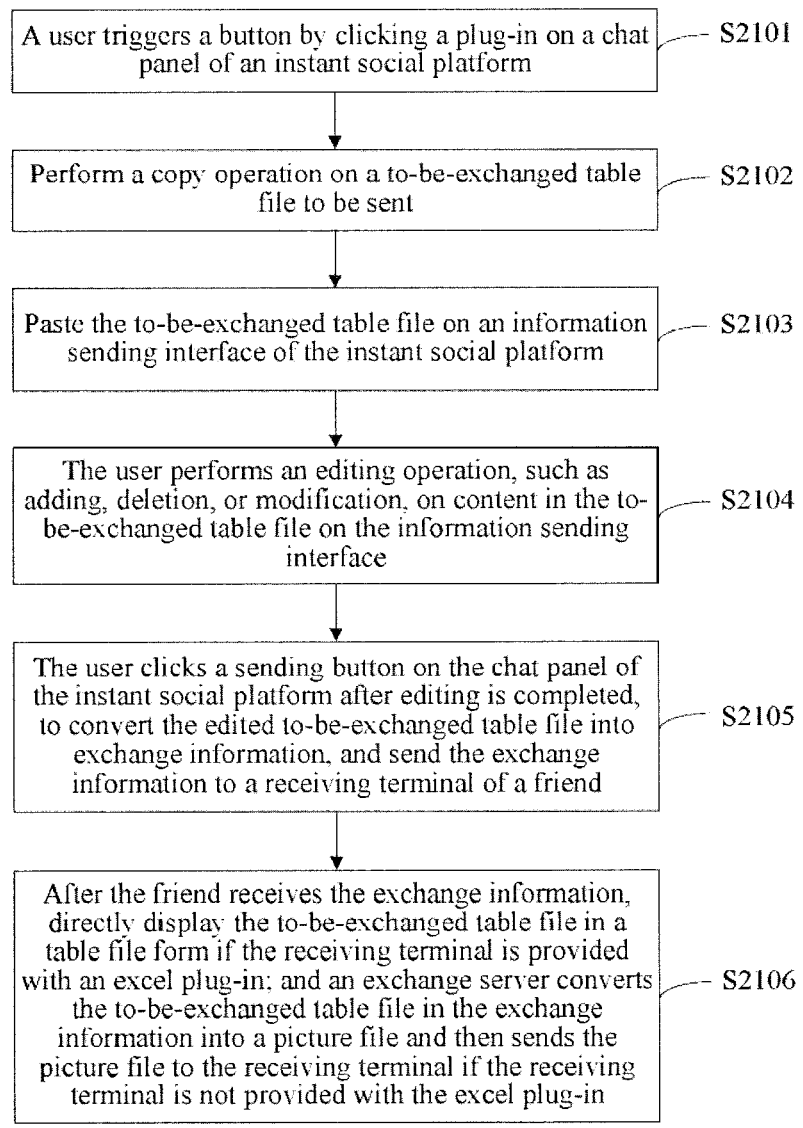
FIG. 21 is a flowchart of a specific embodiment of an information creation method and an information creation apparatus according to this application.

Specific working principles of obtaining the to-be-exchanged table file by means of pasting or dragging, and sending the to-be-exchanged table file of the information creation method and the information creation apparatus in this application are described below by using a specific embodiment. Referring to FIG. 21, FIG. 21 is a flowchart of a specific embodiment of an information creation method and an information creation apparatus according to this application. The information creation apparatus in this specific embodiment is disposed on an information sending terminal, so that the information sending terminal sends the to-be-exchanged table file to an information receiving terminal. Creation and sending processes of the to-be-exchanged table file include:

Step S2101: The user triggers a button 111 by clicking a plug-in on the chat panel of the instant social platform in FIG. 22, to trigger an excel plug-in, that is, the table information processing plug-in.

Step S2102: Perform a copy operation on a to-be-exchanged table file 113 to be sent.

Step S2103: Pasting the to-be-exchanged table file 113 on an information sending interface 112 of the instant social platform in FIG. 22. Because of existence of the excel plug-in, the to-be-exchanged table file 113 is displayed on the information sending interface 112 in a table file form, as shown in FIG. 22.

Step S2104: The user performs an editing operation, such as adding, deletion, or modification, on content in the to-be-exchanged table file 113 on the information sending interface 112.

Step S2105: The user clicks a sending button 114 on the chat panel of the instant social platform after editing is completed, to convert the edited to-be-exchanged table file 113 into exchange information to be sent to an exchange server. The exchange information is sent to a receiving terminal of a friend by the server.

Step S2106: After the friend receives the exchange information, directly display the to-be-exchanged table file 113 in the table file form if the receiving terminal is provided with the excel plug-in; and the exchange server converts the to-be-exchanged table file 113 in the exchange information into a picture file and then sends the picture file to the receiving terminal if the receiving terminal is not provided with the excel plug-in, so as to ensure that the receiving terminal can display normally.

In this way, processes of creating and sending the to-be-exchanged table file in the information creation method and the information creation apparatus in the specific embodiment are completed.

Figure 23:
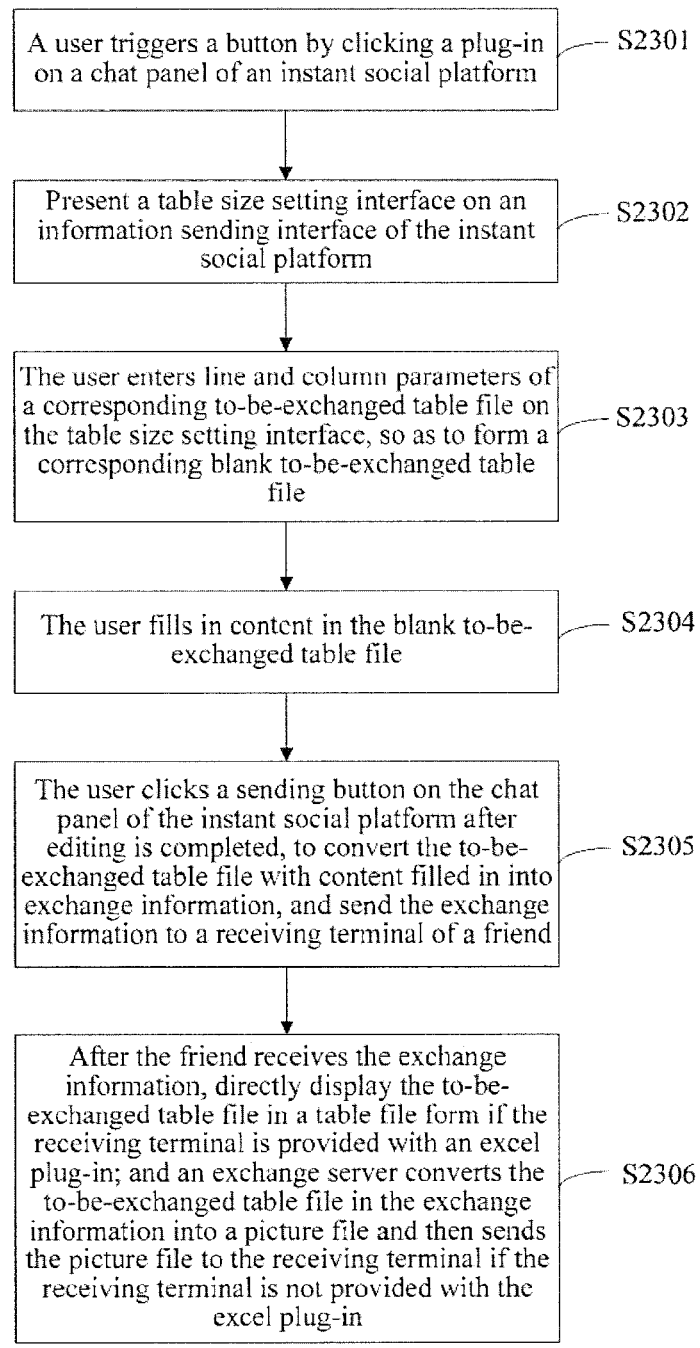
FIG. 23 is a flowchart of a second specific embodiment of an information creation method and an information creation apparatus according to this application.

Specific working principles of creating the to-be-exchanged table file by using the table information processing plug-in, and sending the to-be-exchanged table file of the information creation method and the information creation apparatus in this application are described below by using a specific embodiment. Referring to FIG. 23, FIG. 23 is a flowchart of a specific embodiment of an information creation method and an information creation apparatus according to this application. The information creation apparatus in this specific embodiment is disposed on an information sending terminal, so that the information sending terminal sends the to-be-exchanged table file to an information receiving terminal. The creation and sending processes of the to-be-exchanged table file include:

Step S2301: The user triggers the button 151 by clicking a plug-in on the chat panel of the instant social platform in FIG. 24, to trigger an excel plug-in, that is, the table information processing plug-in.

Step S2302: Because of existence of the excel plug-in, present the table size setting interface 153 on the information sending interface 152 of the instant social platform, as shown in FIG. 24A.

Step S2303: The user enters line and column parameters of a corresponding to-be-exchanged table file on the table size setting interface 153, so as to form a corresponding blank to-be-exchanged table file 154, as shown in FIG. 24B.

Step S2304: The user fills in content in the blank to-be-exchanged table file 154.

Figure 24C:
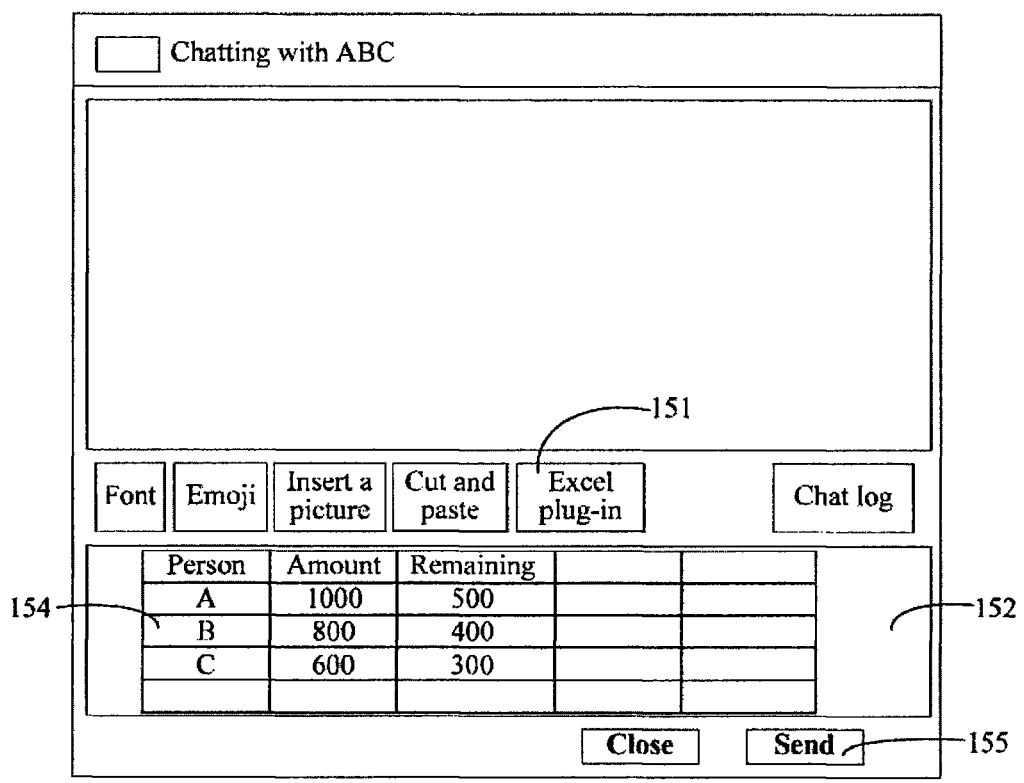
Figure 24D:
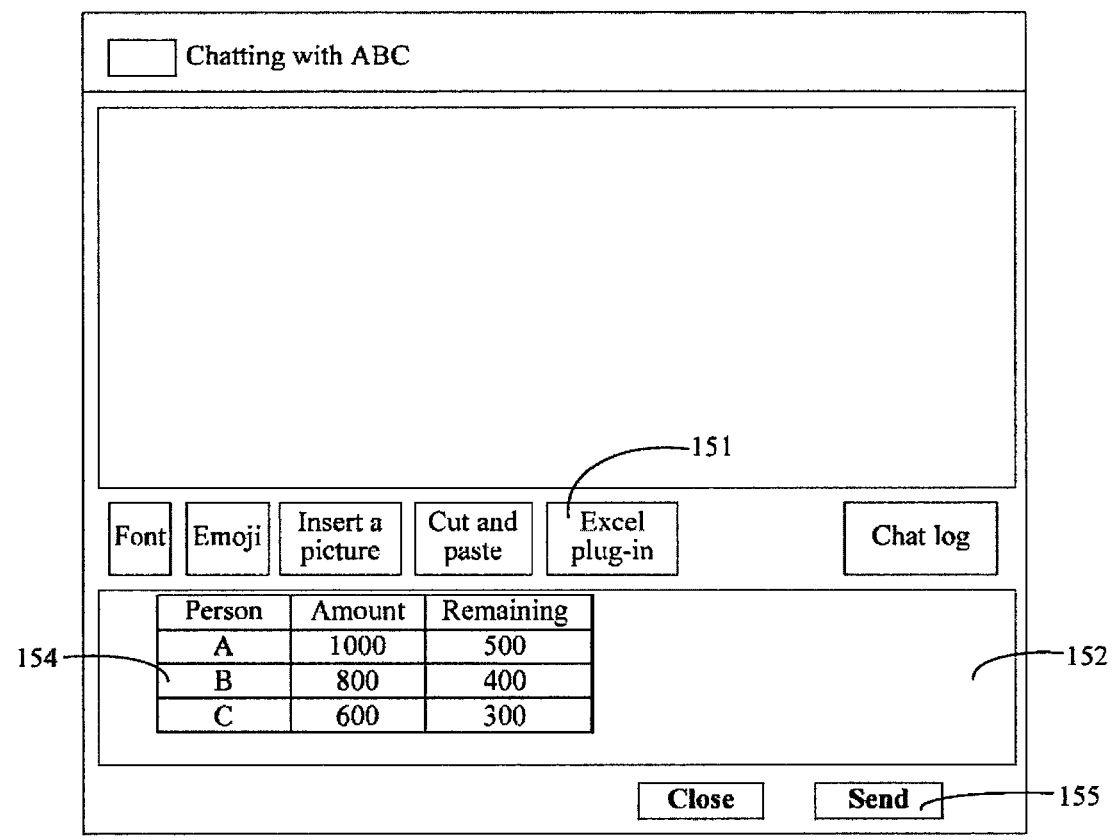

Step S2305: The user clicks a sending button 155 on the chat panel of the instant social platform after editing is completed, to convert the to-be-exchanged table file 154 with content filled in into exchange information, and send the exchange information to a receiving terminal of a friend. Herein, the to-be-exchanged table file may be simplified by using the table information processing plug-in, as shown in FIG. 24C (before the simplification) and FIG. 24D (after the simplification).

Step S2306: After the user receives the exchange information, directly display the to-be-exchanged table file in the table file form if the receiving terminal is provided with the excel plug-in; and the exchange server converts the to-be-exchanged table file in the exchange information into a picture file and then sends the picture file to the receiving terminal if the receiving terminal is not provided with the excel plug-in, so as to ensure that the receiving terminal can display normally.

In this way, processes of creating and sending the to-be-exchanged table file in the information creation method and the information creation apparatus in the specific embodiment are completed.

By using the information creation method, the information sending method, the information creation apparatus, and the information sending apparatus in this application, presentation and editing operations may be performed on the blank to-be-exchanged table file on the information sending interface, and the exchange information having the table file may be sent, thereby improving related table file communication efficiency, and resolving a technical problem that the related table file communication efficiencies of the information creation method, the information sending method, the information creation apparatus, and the information sending apparatus are relatively low.

Terms such as "component", "module", "system", "interface", and "process" used in this application usually are used to indicate computer-related entities: hardware, combinations of hardware and software, software, or software being executed. For example, a component may be, but is not limited to, a process that runs on a processor, a processor, an object, an executable application, a thread during execution, a program, and/or a computer. As shown in the figures, both an application that runs on a controller and the controller may be components. One or more components may reside within a process and/or a thread during execution, and the one or more components may be located on one computer and/or distributed between two or more computers.

Figure 25:
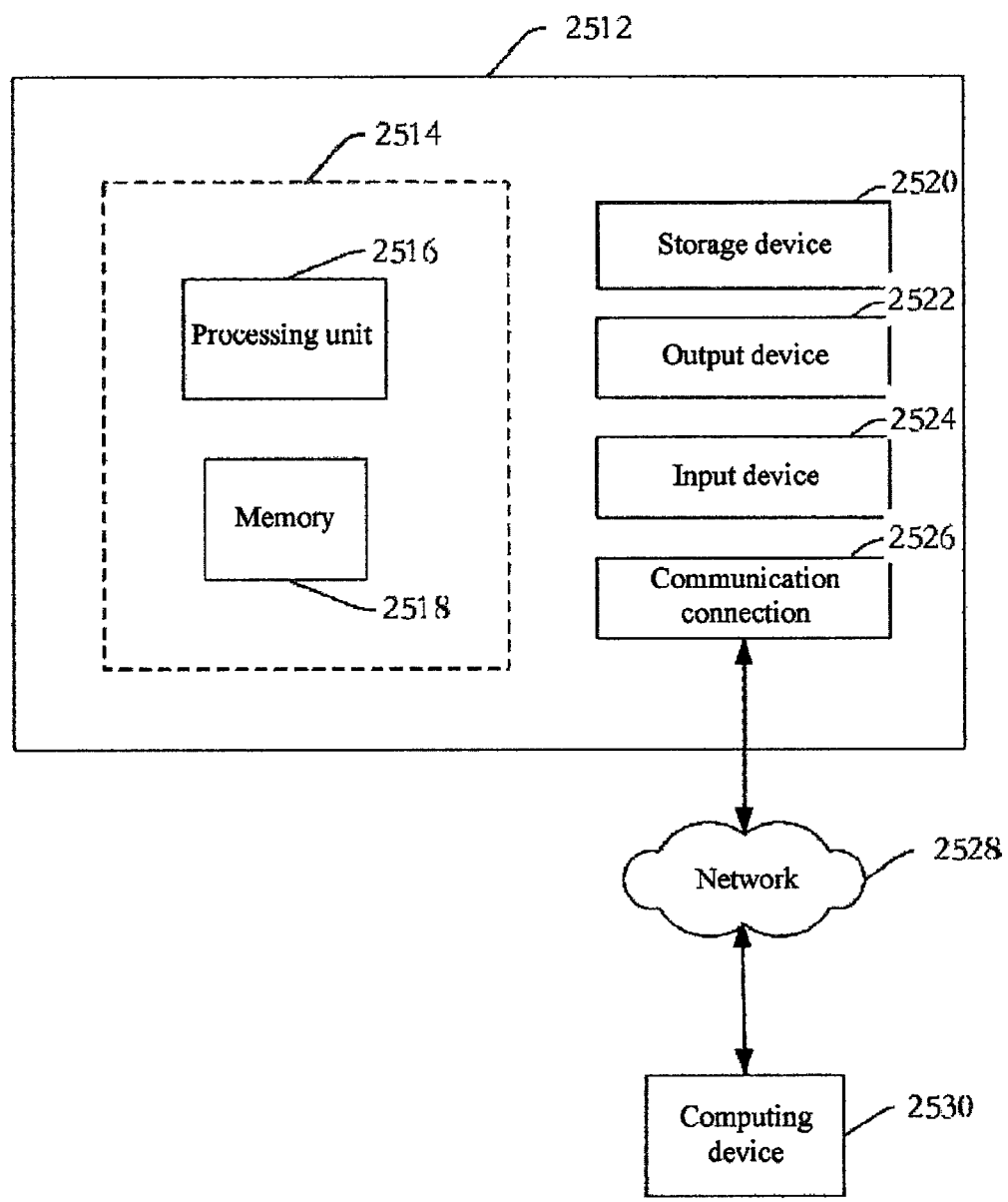
FIG. 25 is a schematic structural diagram of a working environment of an electronic device in which a message creation apparatus and a message sending apparatus are located according to this application.

FIG. 25 and subsequent discussions provide a brief and general description for implementing a working environment of an electronic device in which a message creation apparatus and a message sending apparatus in this application are located. The working environment in FIG. 25 is merely an example of a proper working environment, and is not aimed at making suggestions on uses of the working environment or any limitation to a scope of functions. An electronic device 2512 in this example includes, but is not limited to, a wearable device, a head-mounted device, a healthcare platform, a personal computer, a server computer, a handheld or laptop device, a mobile device (for example, a mobile phone, a personal digital assistant (PDA), or a media player), a multiprocessor system, a consumer electronic device, a small computer, a large computer, a distributed computing environment including any of the foregoing systems or devices, and the like.

Although it is not required, this example is described in a general background in which "computer readable instructions" are executed by one or more electronic devices. The computer readable instructions may be distributed by using a computer readable medium (discussed below). The computer readable instructions may be used to implement a program module, for example, perform a particular task or achieve a function, an object, an application programming interface (API), a data structure of a particular abstract data type. Typically, functions of the computer readable instructions may be randomly combined or distributed in various environments.

FIG. 25 shows an example of the electronic device 2512 that includes one or more examples of the message creation apparatus and the message sending apparatus is this application. In a configuration, the electronic device 2512 includes at least a processing unit 2516 and a memory 2518. According to a specific configuration and type of the electronic device, the memory 2518 may be a volatile memory (for example, a RAM), a non-volatile memory (for example, a ROM or a flash memory), or a combination of the volatile memory and the non-volatile memory. The configuration is shown in FIG. 25 by a dashed line 2514.

In other embodiments, the electronic device 2512 may include additional features and/or functions. For example, the device 2512 may further include an additional storage device (for example, being removable and/or non-removable) that includes, but is not limited to a magnetic storage device or an optical storage device. The additional storage device is shown in FIG. 25 by using a storage device 2520. In an embodiment, the computer readable instructions for implementing one or more embodiments provided in this specification may be in the storage device 2520. The storage device 2520 may further store other computer readable instructions for implementing an operating system, an application program, and the like. The computer readable instructions may be loaded into the memory 2518 to be executed by, for example, the processing unit 2516.

Term "computer readable medium" used in this application includes a computer storage medium. The computer storage medium includes volatile, non-volatile, removable, and non-removable media implemented by any method or technology for storing information such as the computer readable instructions or other data. The memory 2518 and the storage device 2520 are examples of the computer storage medium. The computer storage medium includes, but is not limited to, a RAM, a ROM, an EEPROM, a flash memory or another memory technology, a CD-ROM, a digital versatile disk (DVD) or another optical storage device, a cassette, a magnetic tape, a disk storage device or another magnetic storage device, or any other media that can be used to store expected information and can be accessed by the electronic device 2512. Any one such computer storage mediums is a part of the electronic device 2512.

The electronic device 2512 may further include a communication connection 2526 that allows the electronic device 2512 to communicate with other devices. The communication connection 2526 may include, but is not limited to a modem, a network interface card (NIC), an integrated network interface, a radio frequency transmitter/receiver, an infrared port, a USB connector, or another port configured to connect the electronic device 2512 to another electronic device. The communication connection 2526 may include a wired connection or a wireless connection. The communication connection 2526 may transmit and/or receive a communication media.

Term "computer readable medium" may include a communication medium. The communication medium typically includes the computer readable instructions or other data in a "modulated data signal" of a carrier or another transmission mechanism, and includes any information delivering medium. The term "modulated data signal" may include a signal whose one or more properties are set or changed by means of encoding information to the signal.

The electronic device 2512 may include an input device 2524, such as a keyboard, a mouse, a pen, a voice input device, a touch input device, an infrared camera, a video input device, and/or any other input device. The device 2512 may also include an output device 2522, such as one or more displays, a speaker, a printer, and/or any other output device. The input device 2524 and the output device 2522 may be connected to the electronic device 2512 by means of a wired connection, a wireless connection, or any combination thereof. In an embodiment, an input device or output device from another electronic device may be used as the input device 2524 or the output device 2522 of the electronic device 2512.

Components of the electronic device 2512 may be connected to each other by means of various interconnections (for example, a bus). Such an interconnection may include a peripheral component interconnect (PCI) (for example, a quick PCI), a universal serial bus (USB), a live wire (IEEE 1394), an optical bus structure, and the like. In another embodiment, the components of the electronic device 2512 may be mutually connected by means of a network. For example, the memory 2518 may include a plurality of physical storage units that are located at different physical locations and are mutually connected by means of the network.

A person skilled in the art may learn that the storage devices for storing the computer readable instructions may be distributed across the network. For example, an electronic device 2530 that can be accessed by a network 2528 may store the computer readable instructions for implementing one or more embodiments provided in this application. The electronic device 2512 may access the electronic device 2530 and download some or all of the computer readable instructions for execution. Alternatively, the electronic device 2512 may download a plurality of computer readable instructions according to requirements, or some instructions may be executed by the electronic device 2512 and some instructions may be executed by the electronic device 2530.

This specification provides various operations in the embodiments. In an embodiment, the one or more operations may compose the computer readable instructions stored on one or more computer readable media. The computer readable instructions enable a computing device to execute the operations when being executed by the electronic device. An order for describing some or all operations should not be construed as to imply that these operations are necessarily order dependent. A person skilled in the art may understand an alternative sequence having the benefits of this specification. Moreover, it should be understood that not all operations need to exist in each embodiment provided in this specification.

Moreover, although this disclosure is shown and described by using one or more implementations, a person skilled in the art may conceive of equivalent modifications and variants based on the reading and understanding of this specification and the accompanying drawings. This disclosure includes all such modifications and variants. Especially, for various functions performed by the foregoing components (for example, an element or a resource), terms for describing the components correspond to any component that performs a particular function (for example, being equivalent in function) of the components (unless otherwise indicated), although the components are not equivalent in structure to the disclosed structure for performing the function in the exemplary implementations of this disclosure shown in this specification. In addition, although the particular feature of this disclosure are disclosed with respect to merely one of several implementations, this feature may be combined with one or more other features of other implementations that may be, for example, expected by or advantageous to a given or a particular application. Moreover, terms such as "comprise", "have", and "include" or variants thereof are used in the specific implementations or the claims, and such terms are intended to be inclusive in a manner similar to the term "include".

Functional units in the embodiments of this application may be integrated into one processing module, or each of the units may exist alone physically, or two or more units are integrated into one module. The integrated module may be implemented in a form of hardware, or may be implemented in a form of a software functional module. When the integrated module is implemented in the form of a software functional module and sold or used as an independent product, the integrated unit may be stored in a computer-readable storage medium. The storage medium described above may be a read-only memory, a magnetic disc, an optical disc, or the like. The foregoing devices or systems may implement the methods in the corresponding method embodiments.

In view of the above, although this application is disclosed in the above by using embodiments. Sequence numbers of the embodiments, such as "first" and "second" are merely used for ease of description, and do not limit the sequence of the embodiments of this application. Moreover, the foregoing embodiments are not intended to limit this application. Persons of ordinary skill in the art may make various variations and modifications without departing from the spirit and scope of this application. Therefore, the protection scope of this application should fall within the scope defined by the claims.

It is noted that the various modules, submodules, units, subunits, and components in the present disclosure can be implemented using any suitable technology. For example, a module or a unit can be implemented using processing circuitry. In an example, a module or a unit can be implemented using one or more integrated circuits (IC). In another example, a module or a unit can be implemented as one or more processors executing software instructions. In another example, interface circuitry is used to implement a receiving unit (or module) and/or a sending unit (or module).

What is claimed is:

1. A method for information creation, the method comprising:

obtaining, by interface circuitry of an information creation apparatus, a table information creation instruction from a user of the information creation apparatus, and triggering, by processing circuitry of the information creation apparatus, a table information processing plug-in according to the table information creation instruction;

obtaining, by the interface circuitry of the apparatus, a table file through the table information processing plug-in, and presenting, by the processing circuitry of the apparatus, the table file on an information sending graphical user interface (GUI) of the information creation apparatus which is a sub-portion of a chat panel of an application that includes a first window to display a conversation with another user and a second window to display information that is generated to be sent to the other user prior to receiving an input to send the generated information to the other user; and receiving, via the interface circuitry of the apparatus, an information creation instruction, and converting, by the processing circuitry of the apparatus, the table file presented on the information sending GUI into first message information to be sent to a receiving terminal according to the information creation instruction, wherein the information sending GUI is configured to present a table according to the table file and receive an editing operation on the table file directly within the second window.

2. The method for information creation according to claim 1, further comprising:

receiving, by the interface circuitry of the apparatus, the table file; and performing, via the processing circuitry of the apparatus, a presentation operation on the table file through the table information processing plug-in to present the table according to the table file on the information sending GUI.

3. The method for information creation according to claim 1, further comprising:

presenting, via the interface circuitry of the apparatus, on the information sending GUI, a blank table file through the table information processing plug-in; and receiving, by the interface circuitry of the apparatus, a table file editing instruction, performing, by the processing circuitry of the apparatus, the editing operation on the blank table file through the table information processing plug-in according to the table file editing instruction, and presenting the edited table file on the information sending GUI.

4. The method for information creation according to claim 2, further comprising:

receiving, by the interface circuitry of the apparatus, a file pasting instruction, and obtaining a previously copied table file according to the file pasting instruction.

5. The method for information creation according to claim 2, further comprising:

receiving, by the interface circuitry of the apparatus, a file dragging instruction, and obtaining, according to the file dragging instruction, the table file that is dragged to the information sending GUI.

6. The method for information creation according to claim 2, further comprising:

performing, by the processing circuitry of the apparatus, the editing operation on the table file presented on the information sending GUI through the table information processing plug-in, and converting, by the processing circuitry of the apparatus, the edited table file into the first message information according to the information creation instruction.

7. The method for information creation according to claim 2, further comprising:

performing, by the processing circuitry of the apparatus, a presentation operation on the table file through the table information processing plug-in when the table information processing plug-in is triggered; and invoking, by the processing circuitry of the apparatus, a system table information plug-in when the table information processing plug-in is not triggered, to convert the table file into a corresponding picture file.

8. The method for information creation according to claim 3, wherein the presenting the blank table file comprises:

presenting, by the interface circuitry of the apparatus, a table size setting GUI through the table information processing plug-in; and receiving, via the interface circuitry of the apparatus, a table size setting instruction on the table size setting GUI, and generating and presenting, by the circuitry of the apparatus, the blank table file through the table information processing plug-in according to the table size setting instruction.

9. The method for information creation according to claim 3, wherein the table file editing instruction includes a line adding instruction, a line deletion instruction, a line editing instruction, a column adding instruction, a column deletion instruction, or a column editing instruction; and the performing the editing operation on the blank table file through the table information processing plug-in according to the table file editing instruction includes:

by the processing circuitry of the apparatus;

performing a line adding operation on the table file according to the line adding instruction;

performing a line deletion operation on the table file according to the line deletion instruction;

performing a column adding operation on the table file according to the column adding instruction;

performing a column deletion operation on the table file according to the column deletion instruction;

performing a line editing operation on the table file according to the line editing instruction; or performing a column editing operation on the table file according to the column editing instruction.

10. The method for information creation according to claim 3, further comprising:

according to the information creation instruction, simplifying, by the processing circuitry of the apparatus, the table file by omitting blank cells of the table file after the table file is edited by the editing operation through the table information processing plug-in; and converting, by the processing circuitry of the apparatus, the simplified table file into the first message information.

11. The method for information creation claim 1, further comprising:

receiving, via the interface circuitry of the apparatus, second message information from a messaging server, the second message information including another table file;

triggering, by the processing circuitry of the apparatus, the table information processing plug-in according to the second message information; and presenting, via the interface circuitry of the apparatus, on an information receiving GUI, the other table file included in the second message information through the table information processing plug-in.

12. A method for information sending, the method comprising:

obtaining, by processing circuitry of an information sending apparatus, message information and determining, by the processing circuitry, a receiving terminal of the message information, the message information including a table file that was directly edited or created in a chat panel of an application, the chat panel including a window to display messages between a first user that generated the message information and another user at the receiving terminal;

determining, by the processing circuitry, whether the receiving terminal has a table information processing plug-in based on receiving, from the receiving terminal, version information of the application which utilizes the table information processing plug-in;

sending, via the processing circuitry, the message information to the receiving terminal when the receiving terminal is determined by the processing circuitry to have a table information processing plug-in; and converting, by the processing circuitry, the table file included in the message information into a picture file, and sending, by the processing circuitry, the picture file to the receiving terminal when the receiving terminal is determined by the processing circuitry not to have the table information processing plug-in.

13. The method for information sending according to claim 12, further comprising:

sending, by the processing circuitry, a table information processing plug-in installation request to the receiving terminal to install the table information processing plug-in when the receiving terminal is determined by the processing circuitry not to have the table information processing plug-in.

14. An information creation apparatus, comprising:

processing circuitry configured to obtain a table information creation instruction from a user of the information creation apparatus, and trigger a table information processing plug-in according to the table information creation instruction;

obtain a table file through the table information processing plug-in, and present the table file on an information sending graphical user interface (GUI) of the information creation apparatus which is a sub-portion of a chat panel of an application that includes a first window to display a conversation with another user and a second window to display information that is generated to be sent to the other user prior to receiving an input to send the generated information to the other user; and receive an information creation instruction, and convert the table file presented on the information sending GUI into first message information to be sent to a receiving terminal according to the information creation instruction, wherein the information sending GUI is configured to present a table according to the table file and receive an editing operation on the table file directly within the second window.

15. The information creation apparatus according to claim 14, wherein the processing circuitry is further configured to:

receive the table file; and perform a presentation operation on the table file through the table information processing plug-in to present the table of the table file on the information sending GUI.

16. The information creation apparatus according to claim 14, wherein the processing circuitry is further configured to:

present, on the information sending GUI, a blank table file through the table information processing plug-in; and receive a table file editing instruction, and perform the editing operation on the blank table file through the table information processing plug-in according to the table file editing instruction, and present the edited table file on the information sending GUI.

17. The information creation apparatus according to claim 15, wherein the processing circuitry is further configured to:

receive a file pasting instruction, and obtain a previously copied table file according to the file pasting instruction.

18. The information creation apparatus according to claim 15, wherein the processing circuitry is further configured to:

receive a file dragging instruction, and obtain, according to the file dragging instruction, the table file that is dragged to the information sending GUI.

19. The information creation apparatus according to claim 15, wherein the processing circuitry is further configured to:

convert the edited table file into the first message information according to the information creation instruction.

20. The information creation apparatus according to claim 15, wherein the processing circuitry is further configured to:

invoke a system table information plug-in when the table information processing plug-in is not triggered, to convert the table file into a corresponding picture file.

* * * * *